United States Patent [19]

Yamaguchi

[11] Patent Number: 5,161,099
[45] Date of Patent: Nov. 3, 1992

[54] CONTROL METHOD AND CONTROLLER

[76] Inventor: Noboru Yamaguchi, 203 Isogo-Mansion, 11-15 Isogodai Isogo-ku, Yokohama-shi, Kanagawa-ken, Japan

[21] Appl. No.: 411,288

[22] Filed: Sep. 22, 1989

[30] Foreign Application Priority Data

Mar. 20, 1989 [JP] Japan .................. 1-68292

[51] Int. Cl.$^5$ .............................................. G05B 13/02
[52] U.S. Cl. ..................................... 364/153; 364/154
[58] Field of Search ........................... 364/153–156, 364/166, 157, 176; 318/624, 626

[56] References Cited

U.S. PATENT DOCUMENTS

| | | | |
|---|---|---|---|
| 3,478,551 | 11/1969 | Alsop | 364/176 |
| 3,566,241 | 2/1971 | Ross | 364/153 |
| 3,676,648 | 7/1972 | Wesner | 364/166 |
| 4,163,279 | 7/1979 | Kubota | 364/153 |
| 4,175,283 | 11/1979 | Buchwald et al. | 364/153 |
| 4,250,543 | 2/1981 | Smith et al. | 364/153 |
| 4,265,263 | 5/1981 | Hobbs | 364/157 |
| 4,344,128 | 8/1982 | Frye | 364/153 |
| 4,498,036 | 2/1985 | Salemka | 364/157 |
| 4,546,426 | 10/1985 | Häfner et al. | 364/153 |
| 4,669,058 | 5/1987 | Schneider et al. | 364/157 |
| 4,675,804 | 6/1987 | Weimer | 364/157 |
| 4,885,676 | 12/1989 | Zweishaft | 364/153 |

FOREIGN PATENT DOCUMENTS

| | | |
|---|---|---|
| 2807855 | 8/1978 | Fed. Rep. of Germany . |
| 3621083 | 1/1988 | Fed. Rep. of Germany . |
| 2277980 | 2/1976 | France . |
| 8908873 | 9/1989 | PCT Int'l Appl. . |
| 2019618 | 10/1979 | United Kingdom . |
| 2162972 | 2/1986 | United Kingdom . |

OTHER PUBLICATIONS

Patent Abstracts of Japan vol. 9, No. 186 (P-377)(1909), 2 Aug. 1985; & JP-A- 60057402 (Hitachi) Mar. 4, 1985 * whole abstract *.

Primary Examiner—Jerry Smith
Assistant Examiner—Jin Trammell
Attorney, Agent, or Firm—Sughrue, Mion, Zinn, Macpeak & Seas

[57] ABSTRACT

A control method for controlling the output of a controlled system in response to a control value including the steps of
monitoring a controlled variable which is controlled by the controlled system, to find a monitor value which represents the controlled variable, and
finding a differential value representing the difference between the control value and the monitor value and
when the differential value exceeds a specified upper limit value, replacing the differential value with the upper limit value, and when the differential value drops below a specified lower limit value, replacing the differential value with the lower limit value, thus finding a clipped value which is the differential value clipped by the upper limit value and the lower limit value, and
synthesizing the control value and the clipped value in such a way that the monitor value becomes negative feedback to the control value.

6 Claims, 9 Drawing Sheets

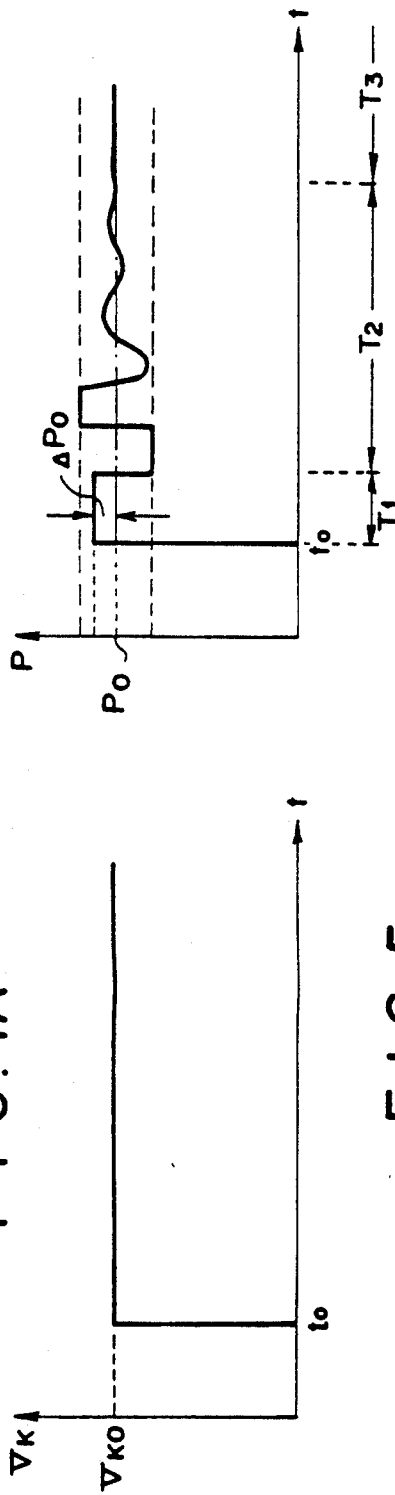
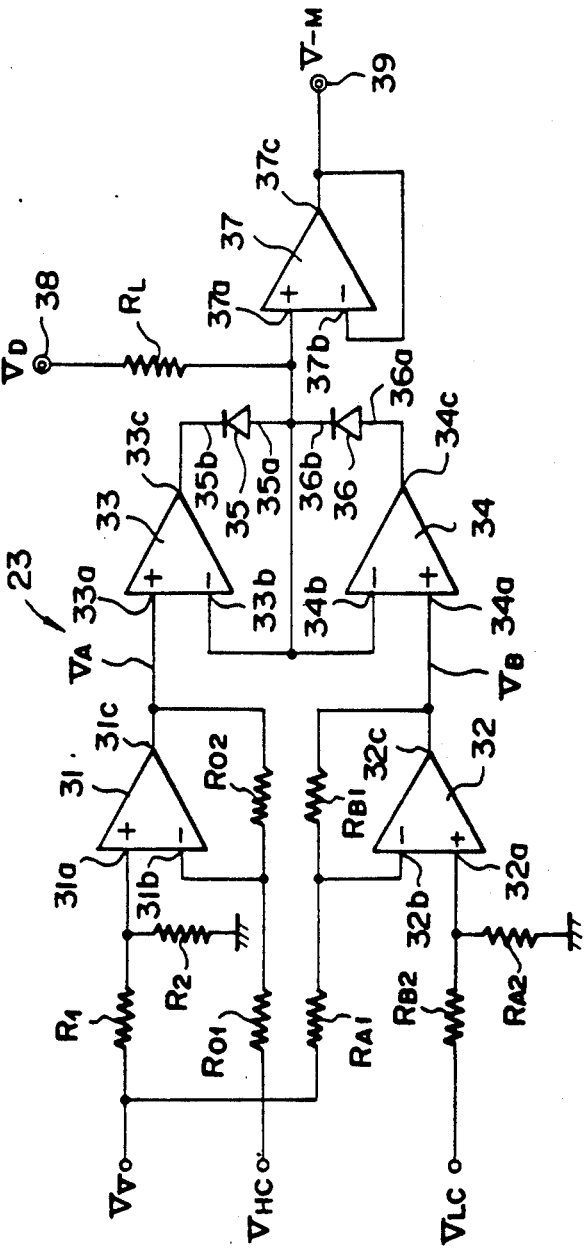
F I G. 4A
F I G. 4B
F I G. 5

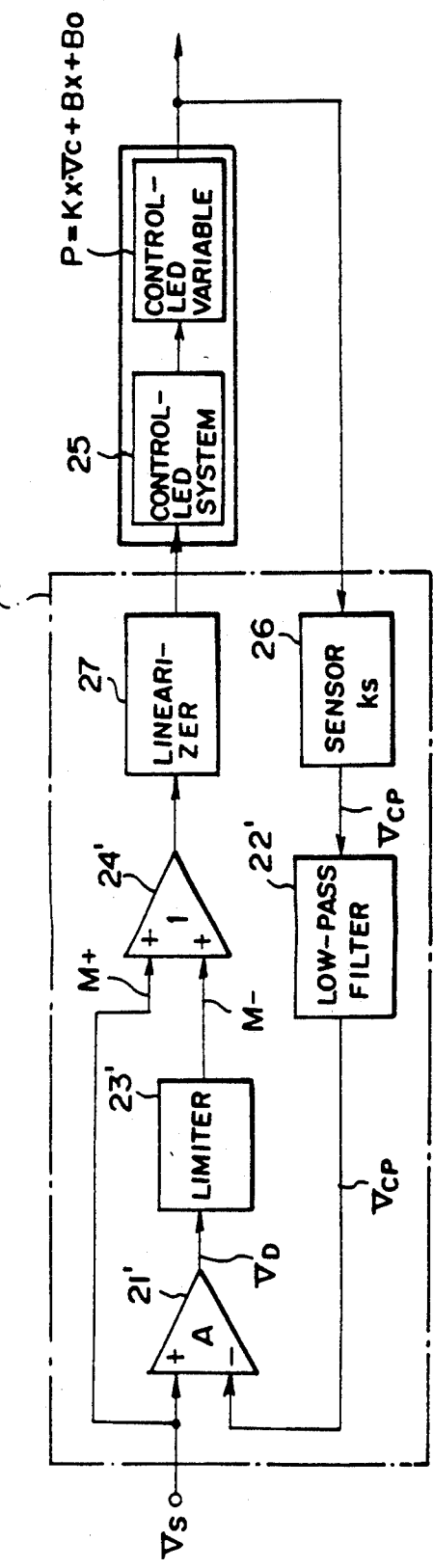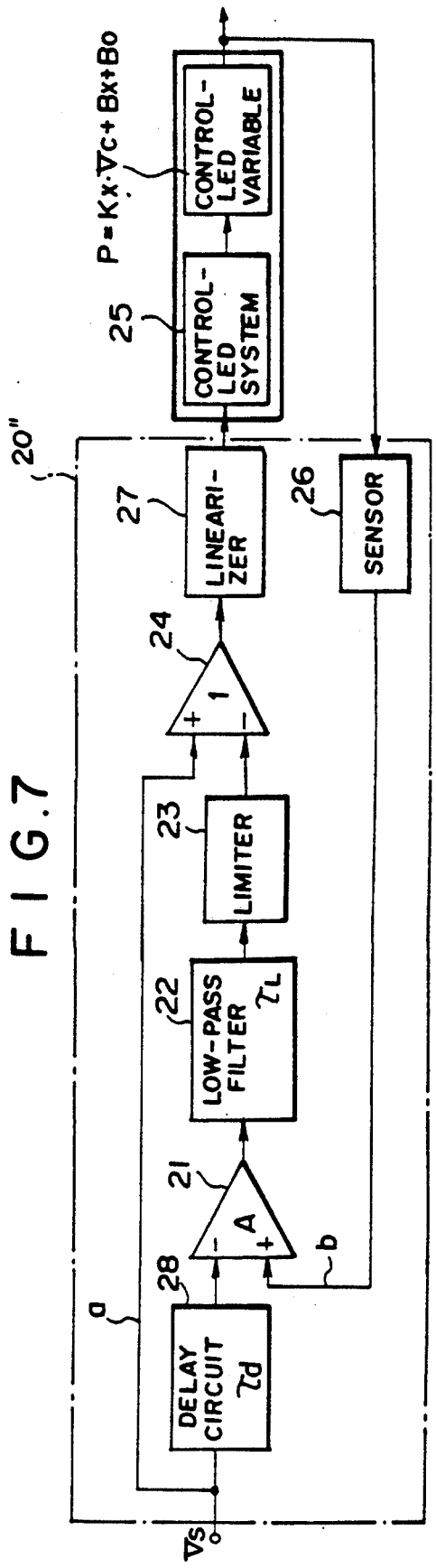

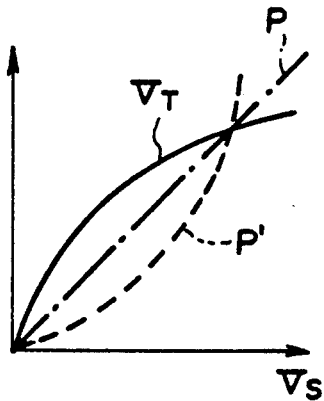
FIG. 11A PRIOR ART
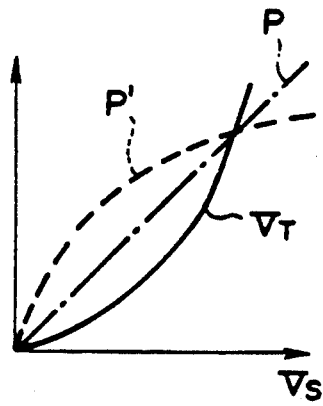
FIG. 11B PRIOR ART
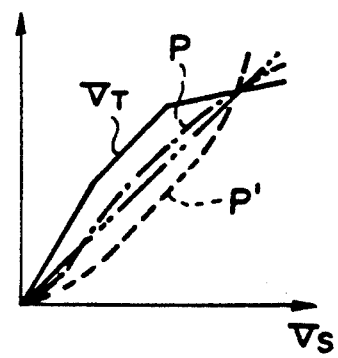
FIG. 11C PRIOR ART
FIG. 12 PRIOR ART
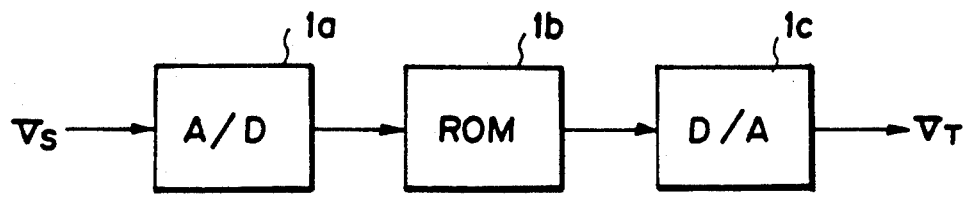
FIG. 13 PRIOR ART
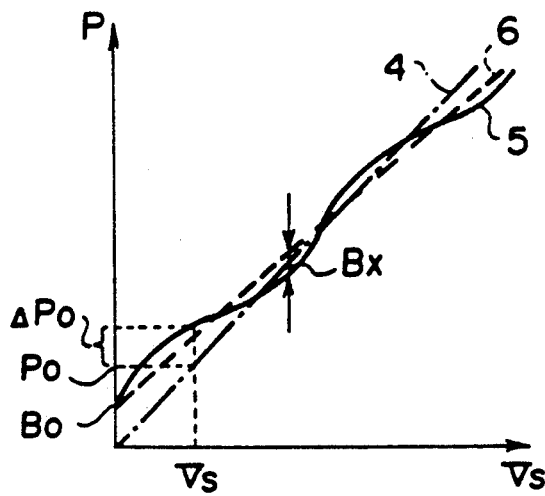

CONTROL METHOD AND CONTROLLER

BACKGROUND OF THE INVENTION

1. Field of the Invention

This invention relates to a control method for controlling the output (e.g., the speed of revolution of a servo motor or the opening of a flow rate control valve) of a controlled system (e.g. a servo motor or a flow rate control valve) in response to a control value, and a controller used in the embodiment of this control method.

2. Description of the Prior Art

Control of various physical quantities is carried out in a wide range of fields including temperature and humidity control using air conditioners, tape speed control for video and audio cassette tape recorders using servo motors, tank level control done by controlling flow rates of fluids using fluid-control valves, along with hydraulic, pneumatic and other types of pressure control, torque control, positioning control, and voltage, current and power control.

There are two methods of controlling these physical quantities, namely open-loop control and feedback control. Open-loop control has good response to the controlled variable (e.g. tape speed or another physical quantity to be controlled) but has a disadvantage in that it cannot eliminate all error between the set point for the controlled variable and the actual value of the controlled variable. On the other hand, feedback control is able to bring the actual value of the controlled variable into agreement with its set point, but has the disadvantages of slow response and a large amount of ringing which occurs if attempts are made to improve response.

Before describing the details of open-loop control and feedback control, the attached drawings will be briefly described.

BRIEF DESCRIPTION OF THE DRAWINGS

FIGS. 4A and 4B are diagrams illustrating, respectively, the control signal $V_K$ and transient response of controlled variable P provided as input to the controller shown in FIG. 1.

FIG. 5 is a circuit diagram illustrating an example of the circuit structure of the limiter shown in FIG. 1.

FIG. 6 is a block diagram illustrating another preferred embodiment of the controller of the invention.

FIG. 7 is a block diagram illustrating still another different preferred embodiment of the controller of the invention.

FIGS. 11 through 13 are diagrams used to explain a linearizer.

FIG. 12 is a block diagram illustrating an example of the structure of a linearizer which carries out polygonal line compensation.

FIG. 13 is a diagram representing the controlled variable P as a function of the variable $V_S$.

DETAILED DESCRIPTION OF THE PRIOR ART

Here follows a detailed description of open-loop control and feedback control in reference to the figures.

Figure 9:
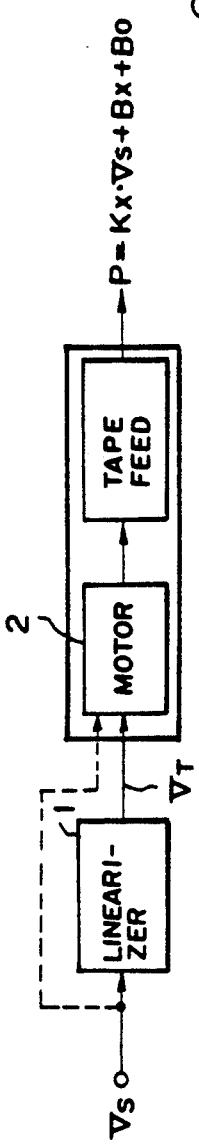
FIG. 9 is a block diagram illustrating an example of open-loop control.
Figure 10:
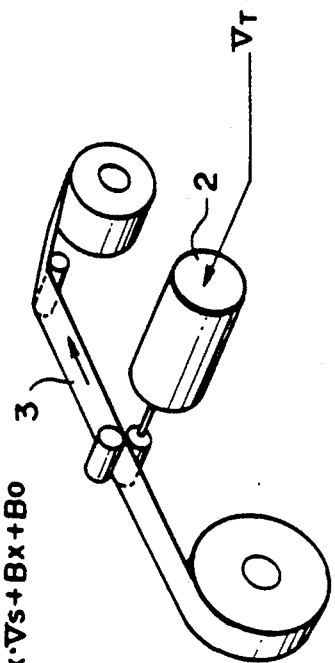
FIG. 10 is a diagram graphically illustrating an object of control which includes the motor shown in FIG. 9.

FIG. 9 is a block diagram illustrating an example of open-loop control, while FIG. 10 is a diagram graphically illustrating an object of control which includes the motor shown in FIG. 9.

The speed P at which a long tape 3 is conveyed in the direction indicated by the arrow is controlled by controlling the speed of revolution of motor 2.

Output from a control computer or the like (not shown) in the form of a controlled control signal $V_S$ is provided as input to linearizer 1, and the output signal $V_T$ of linearizer 1 is provided as input to a controlled system, e.g. the motor 2. The long tape 3 is conveyed in response to the output of the motor 2, namely the speed of revolution of the motor 2. The controlled variable P in this control system, or the physical quantity to be controlled, is the speed P of the long tape 3. (For the sake of simplicity, in this discussion, the same symbol P will be used to represent both the controlled variable in general and the tape speed which is one example of it.)

FIGS. 11A through 11C are graphs used to explain linearizers in general. The horizontal axis indicates the control signal $V_S$, while the vertical axis indicates linearizer output $V_T$, controlled variable P and the controlled variable P' in the event that the linearizer would be bypassed (specifically, in the event that the control signal $V_S$ would be provided directly as input to the controlled system as shown by the broken line on FIG. 9).

The relationship between control signal $V_S$ and controlled variable P is preferably a proportional relationship such as, for example, if a control voltage as an example of a control signal $V_S$ would change from 1 V to 2 V, the speed P of long tape 3 as an example of a controlled variable would change from 1 m/min. to 2 m/min. To achieve these ends, when control signal $V_S$ is provided directly to the controlled system as input, if the control signal $V_S$ and the controlled variable P are not in proportion, the work of bringing the control signal $V_S$ and the controlled variable P' into proportionality is the role of a linearizer.

FIG. 11A illustrates the case when the linearizer is bypassed and the controlled variable P' varies exponentially with respect to control signal $V_S$; in this case, the input control signal $V_S$ is logarithmically converted by the linearizer, generating a signal $V_T$ which is then provided to the controlled system as input.

FIG. 11B illustrates the case when the linearizer is bypassed and the controlled variable P' varies logarithmically with respect to control signal $V_S$; in this case, the input control signal $V_S$ is exponentially converted by the linearizer.

FIG. 11C illustrates an example of the case when the linearizer is bypassed and the controlled variable P' varies as the nonlinear curve illustrated in the diagram with respect to control signal $V_S$; the linearizer will carry out polygonal line compensation on the input control signal, generating a signal $V_T$. In this case, controlled variable P will not be strictly proportional to control voltage $V_S$, having a certain amount of error as illustrated in FIG. 11C.

FIG. 12 is a block diagram illustrating an example of the structure of a linearizer which carries out polygonal line compensation.

The input control signal $V_S$ undergoes analog-to-digital (A/D) conversion at an A/D converter 1a and becomes input for ROM 1b. ROM 1b is provided with a table for converting control signal $V_S$ to output signal $V_T$, and signal conversion is carried out in reference to this conversion table. After this signal conversion, an analog output signal $V_T$ is generated by a D/A converter 1c. By using such a construction, a linearizer is able to carry out high-precision polygonal line compensation.

Note that if a control signal $V_S$ and controlled variable P are proportional within the required range of precision even without a linearizer, naturally there is no need to provide a linearizer.

The output signal $V_T$ of linearizer 1 of FIG. 9 is provided as input to motor 2 as described above, so the speed of revolution of motor 2 is controlled and ultimately the speed P of the long tape 3 is controlled. Here, the speed P of long tape 3 is proportional to control signal $V_S$ and represented by $$P = K_o V_S \quad (1)$$

while typically the speed P includes the cumulative total of linearizer 1 compensation error, motor 2 speed error, slippage between motor rotation and tape conveyance, and other errors due to various causes, so an approximation of equation (1) is represented by $$P = K_x \cdot V_S + B_x + B_o \quad (2)$$

and a straight-line approximation of this speed P is represented by $$Q = K_x \cdot V_S + B_o \quad (3)$$

FIG. 13 is a graph for describing equations (1) through (3) above. The straight line 4 represented by the alternate long and short dashed line in the graph indicates the ideal case of the control signal $V_S$ and controlled variable P having a completely proportional relationship. The curve 5 represented by the solid line on the graph indicates the actual tape speed P (equation (2)). The straight line 6 represented by the broken line indicates the straight-line approximation Q (equation (3)). As illustrated in this graph, the curve 5 generally does not coincide with the ideal straight line 4, nor does the straight-line approximation 6 exactly match the ideal straight line 4, so $K_x \neq K_0$, and $B_0 \neq 0$.

Here, from equations (2) and (3) above, $$B_x = P - Q \quad (4)$$

where this $B_x$ designates the straight-line approximation error representing the difference between tape speed P (controlled variable P) and the straight-line approximation Q.

This straight-line approximation error $B_x$ is not only a function of control signal $V_S$ as a variable, but is also a value which varies depending on various variable factors including deviation among individual control systems when a plurality of these control systems are manufactured, and the effects of temperature, humidity and such on a single control system. The slope $K_x$ of the straight-line approximation Q ideally has the value of $K_0$ of equation (1), and is a value which varies depending on various variable factors as does the straight-line approximation error $B_x$ above. Furthermore, the $B_0$ contained in equations (2) and (3) above is the value of the straight-line approximation Q when $V_S = 0$, so ideally $B_0 = 0$. Here, consider that the variation depending on various variable factors described above is dependent on slope $K_x$ and straight-line approximation error $B_x$, while $B_0$ is a constant.

Figure 14:
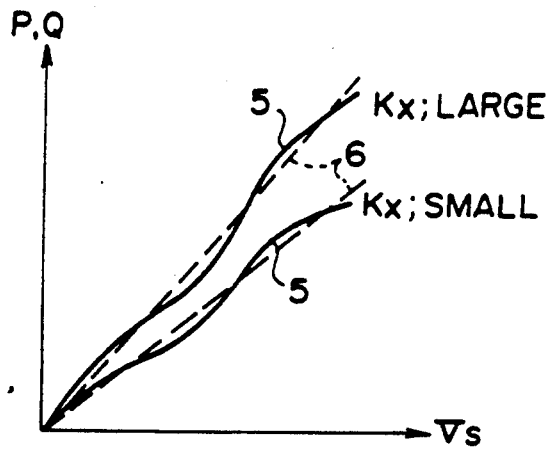
FIGS. 14 through 16 are diagrams illustrating changes in the shape of the controlled variable P and straight-line approximation Q curves depending on changes in the slope $k_x$, straight-line approximation error $B_x$ and value $B_0$.
Figure 15:
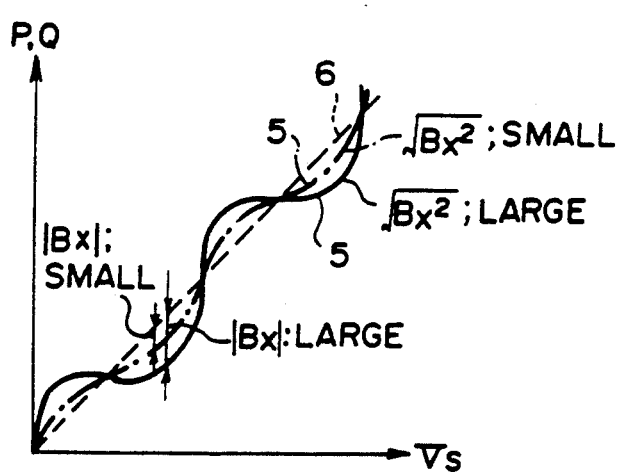

FIGS. 14 and 15, in order to illustrate the concept of equations (2) and (3) which represent controlled variable P (tape speed P of long tape 3) and straight-line approximation Q in greater detail, are diagrams illustrating the changes in controlled variable P and straight-line approximation Q as functions of slope $K_x$, straight-line approximation error $B_x$, and the value of $B_0$, respectively.

Curve 5 and straight line 6 on FIGS. 14 and 15 represent the shape of the functions controlled variable P and straight-line approximation Q, respectively.

Figure 16:
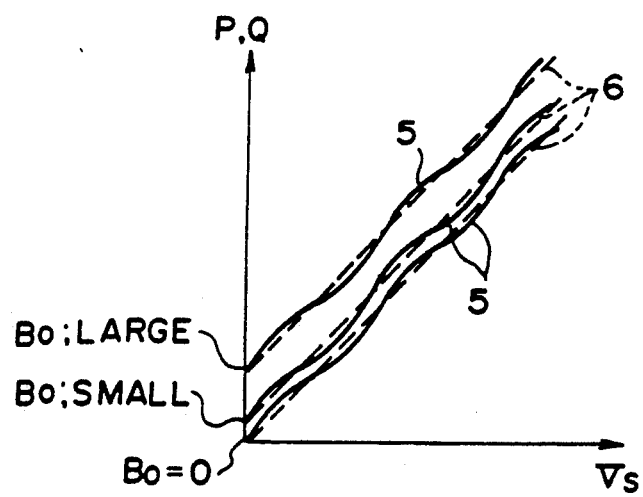

As shown in FIG. 14, when the value of slope $K_x$ is large, the overall slope of curve 5 representing the controlled variable P is steep. As shown in FIG. 15, the larger the absolute value of the straight-line approximation error $B_x$ is at any point on the control signal $V_S$ axis, the greater the displacement of the straight-line approximation Q from the controlled variable P at that point. Thus the larger the square root of $B_x$ squared $\sqrt{B_x^2}$ is, the larger the mean displacement of the controlled variable P from the straight-line approximation Q. As shown in FIG. 16, a larger value of $B_0$ indicates that the straight-line approximation Q passes through a point further from the origin.

Figure 17B:
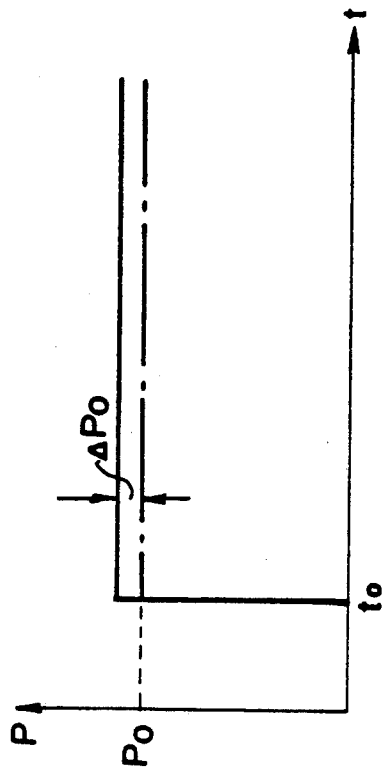
FIGS. 17A and 17B are diagrams illustrating an example of chronological changes in a controlled variable (tape speed) in response to a control signal $V_S$ in the open-loop control system shown in FIG. 9.
Figure 17A:
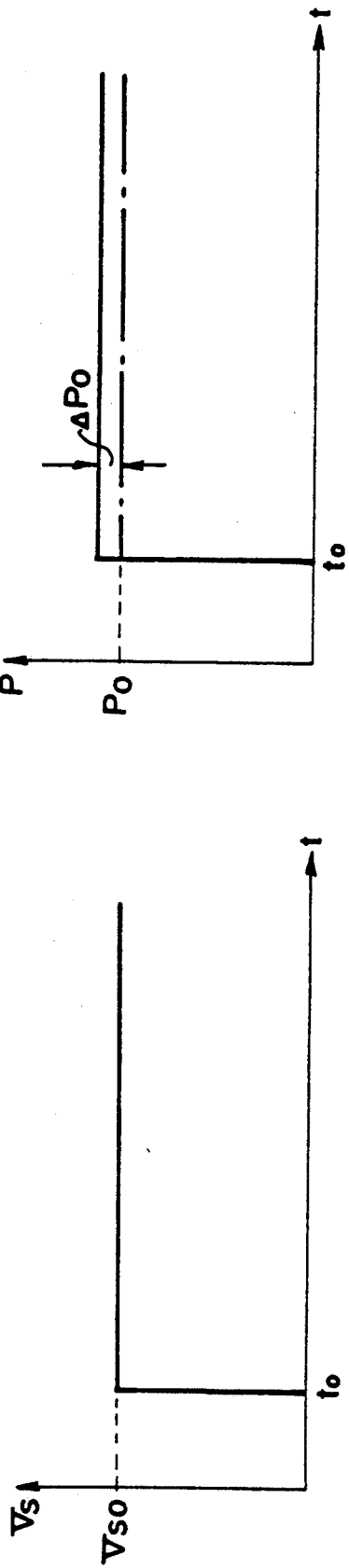
Figure 19:
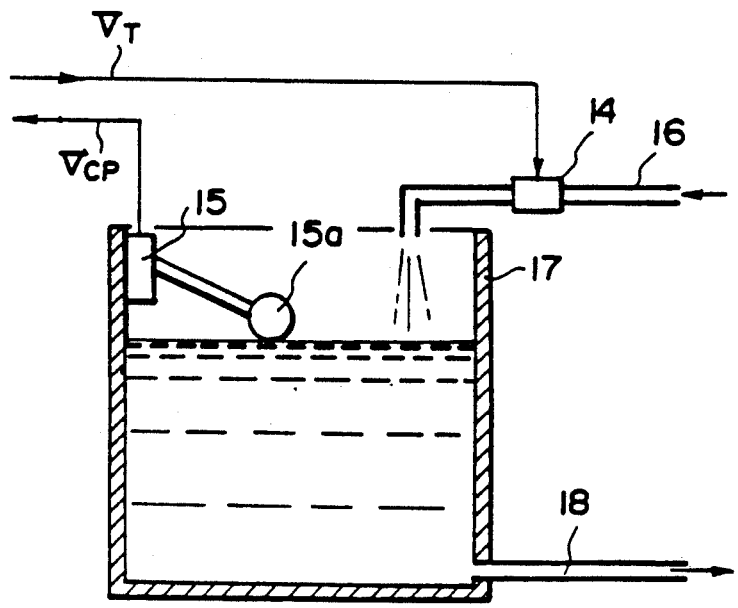
FIG. 19 is a diagram illustrating an object of control including the flow control valve and sensor shown on FIG. 18.

FIGS. 17A and 17B are diagrams illustrating, in the open-loop control system shown in FIG. 19, the changes over time of control signal $V_S$ and the corresponding changes of the tape speed P of long tape 3.

As shown in FIG. 17A, the value of control signal $V_S$ changes in a step-like fashion from $V_s = 0$ to $V_s = V_{So}$ at a time $t_0$. At this time, the tape speed P of long tape 3 changes from $P + 0$ to $P = P_0 + \Delta P_0$. Here, $P_0$ is represented by $$P_o = K_o V_{So} \quad (5)$$

representing the ideal speed corresponding to control signal $V_{So}$.

However, from equation (2), the actual tape speed P is represented by $$P = K_x \cdot V_{So} + B_x + B_o \tag{6}$$

where $\Delta P_0$ is the difference $$\begin{aligned}\Delta P_o &= P - P_o \\ &= (K_x - K_o) \cdot V_{so} + B_x + B_o\end{aligned} \tag{7}$$

between equations (6) and (7), thus representing the error from the ideal speed $P_0$. In the open-loop control system shown in FIG. 9, there is no means of detecting and compensating for this error $\Delta P_0$, so therefore, as long as the control signal $V_S$ maintains the value $V_{So}$, a tape speed containing this error $\Delta P_0$ will be maintained. Equation (7) ( representing $\Delta P_0$ contains the elements $K_x$ and $B_x$ which vary depending on temperature, humidity and various other environmental variables, so the error $\Delta P_0$ will also vary depending on various variable factors.

As described above, open-loop control has the disadvantage of not being able to compensate for this error $\Delta P_0$, but on the other hand, it has the advantage of the controlled variable P being able to quickly follow changes in the control signal $V_S$.

Figure 18:
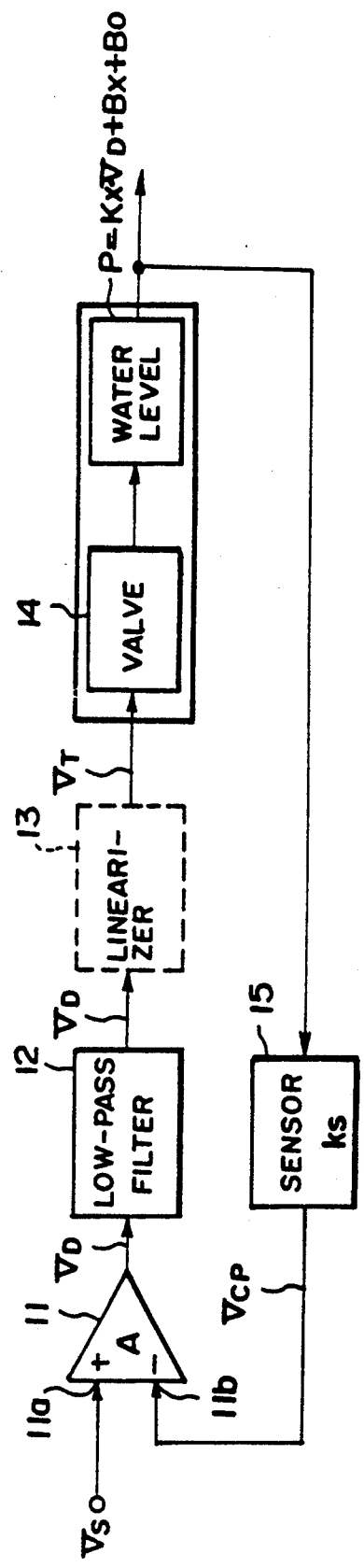
FIG. 18 is a block diagram illustrating an example of feedback control.

FIG. 18 is a block diagram illustrating an example of feedback control, while FIG. 19 is a diagram graphically illustrating an object of control including a flow control valve 14 and sensor 15 shown on FIG. 18.

Water flows into a tank 17 through an inlet pipe 16 and is temporarily stored in this tank 17. An outlet pipe 18 is connected to tank 17 near the bottom, so that water flows out from this outlet pipe. A flow control valve 14 is provided along the inlet pipe 16, so the quantity of water flowing into tank 17 can be controlled by controlling the opening of valve 14. The water level height inside the tank 17 is monitored by means of a water level sensor 15 provided with a float 15a. In the example of feedback control illustrated by FIGS. 18 and 19, the controlled system is flow control valve 14, and the controlled variable P is the water level height P. Note that in this example, for simplicity, the same symbol P will be used to represent both the controlled variable in general and the water level height which is one example of it.

Output from a control computer or the like (not shown) in the form of a controlled control signal $V_S$ is provided as input to the positive input terminal 11a of differential computing element 11. A monitor signal $V_{CP}$ representing the water level height detected by sensor 15 is provided as input to the negative input terminal 11b. The output of differential computing element 11 is a differential signal $V_D$ found by calculating the difference between control signal $V_S$ and monitor signal $V_{CP}$ and then multiplying this difference by A, as shown by the equation $$V_D = A \cdot (V_s - V_{cp}) \tag{8}$$

This differential signal $V_D$, after passing through a low-pass filter 12, is provided as input to linearizer 13. The low-pass filter 12 for oscillation prevention, is used to shut out signals of frequency bands higher than the required frequencies. In the frequency bands of concern here, the differential signal $V_D$ (see equation (8)) provided as output from differential computing element 11 will pass through the low-pass filter 12 unhindered and be provided as input to the linearizer 13. Note that low-pass filter 12 is used for oscillation prevention as described above, but for example, if sensor 15 senses the water level height P integrally with a time constant no less than that specified and this sensor 15 is considered to also take the role of oscillation prevention of the low-pass filter 12 instead of this low-pass filter 12, then this low-pass filter 12 may be omitted. In addition, this low-pass filter 12 need not be arranged in the location indicated in FIG. 18, but rather it may be arranged between the sensor 15 and differential computing element 11 or between the linearizer 13 and valve 14.

The linearizer 13, as in the case of open-loop control described above, modifies the input signal $V_D$ so that the input signal $V_D$ is proportional to water level height P. However, since with feedback control, the controlled variable P (water level height P) is monitored to find the displacement of this controlled variable P from the set point (control signal $V_S$) and then compensated for, the linearizer 13 may be omitted even in the case of a proportional relationship between differential signal $V_D$ and controlled variable P not being established.

The output signal $V_T$ of linearizer 13 is provided as input to flow control valve 14 which is an example of a controlled system, and the opening of this valve 14 is controlled by output signal $V_T$. The water level height P is represented by $$P = K_x \cdot V_D + B_x + B_o \tag{9}$$

Comparing this equation (9) to equation (2), equation (9) is expressed as a function of $V_D$ instead of the $V_S$ of equation (2), but each is a function of the input signal of linearizer 13, and the contents are exactly identical to equation (2), so a detailed explanation is omitted. Note that the linearizer may be omitted as described above.

The water level height P is monitored by a sensor 15, resulting in a monitor signal $V_{CP}$ being generated. This monitor signal $V_{CP}$ can be expressed as $$V_{cp} = k_s P \tag{10}$$

with a conversion coefficient of $k_S$.

Now, water level height P will be found as a function of control signal $V_S$.

Substituting equations (9) and (10) into equation (8) gives $$\begin{aligned}V_D &= A \cdot (V_s - V_{cp}) \\ &= A \cdot (V_s - k_s \cdot P) \\ &= A \cdot \{V_s - k_s \cdot (K_x V_D + B_x + B_o)\} \\ \therefore V_D &= \frac{A \cdot (V_s - k_s \cdot B_x - k_x \cdot B_o)}{1 + A \cdot k_s \cdot K_x}\end{aligned} \tag{11}$$

in which A is typically set to be $$A \geq 10 \tag{12}$$

or another sufficiently large value, so from equation (11), $$V_D \approx \frac{A \cdot (V_s - k_s \cdot B_x - k_s \cdot B_o)}{A k_s K_x} \tag{13}$$

Substituting this equation (13) into equation (9) gives $$P = K_x \cdot \frac{A \cdot (V_s - k_s \cdot B_x - k_s \cdot B_o)}{A \cdot k_s \cdot K_x} + B_x + B_o = \frac{V_s}{k_s} \quad (14)$$

This equation (14) indicates that control signal $V_S$ is proportional to the water level height P with a constant of proportionality of $1/k_s$. Specifically, in a feedback control system, the compensation error of the linearizer 13 and various other types of variation of the environment due to temperature and humidity and other factors are cancelled so that the controlled variable can be brought into agreement with its set point by means of a control signal $V_S$, eliminating the constant error $\Delta P$ which occurs in open-loop control as described above. In this respect, feedback control is superior to open-loop control.

However, the above description is of the steady-state case, but the disadvantages of feedback control only appear in transient states such as, for example, when control signal $V_S$ changes in a step-like fashion.

Figure 20A:
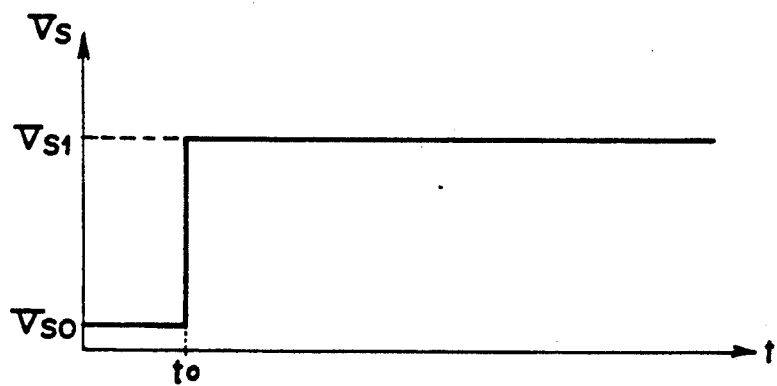
FIGS. 20A and 20B are diagrams illustrating an example of chronological changes in, respectively, control signal $V_S$ and a controlled variable (water level height) in response to control signal $V_S$ in the feedback control system shown in FIG. 18.
Figure 20B:
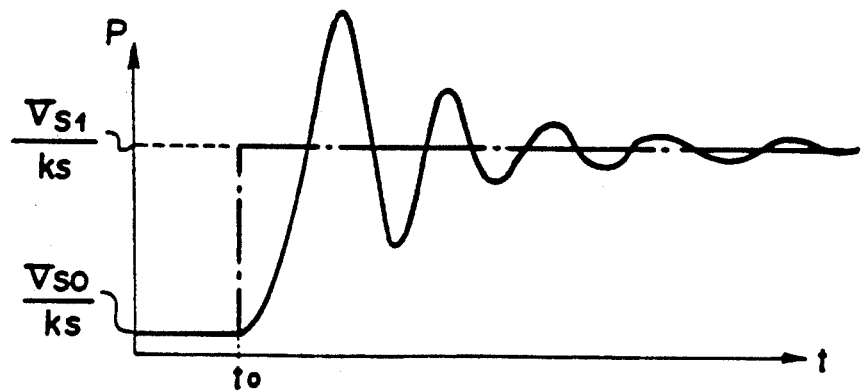

FIGS. 20A and 20B are diagrams illustrating an example of chronological changes in, respectively, control signal $V_S$ and water level height P in response to control signal $V_S$ in the feedback control system shown in FIG. 18.

Suppose the value of control signal $V_S$ changes in a step-like fashion from $V_S=V_{S0}$ to $V_S=V_{S1}$ at a time $t_0$ as shown in FIG. 20A. At this time, a signal corresponding to this control signal $V_S$ is transmitted to valve 14 and the water level begins to change, but since there is a time lag until it is detected by sensor 15, the water level height P, which had heretofore been stable, increases from $P=V_{S0}k_S$ and, due to the accompanying time lag, overshoots the target height $P=V_{S1}/k_S$ up to a peak and then decreases, generating response lag and ringing. Thus feedback control has such a large response lag that it is often unsuited for cases in which high-speed response is required, since the ringing peaks could exceed tolerance limits, causing problems such as the tank 17 of FIG. 19 overflowing, or if, for example, the controlled variable P would be voltage, damage to circuit devices subjected to excessively high voltages.

THE PROBLEM TO BE SOLVED BY THE INVENTION

As described above, both open-loop control and feedback control have their own advantages and disadvantages. For example, if high-speed response is vital, for open-loop control to be employed, either the constant error $\Delta P_0$ (see FIGS. 13 and 17B) must be tolerated or this constant error $\Delta P_0$ reduced by, for example, improving the performance of the linearizer, using circuit devices or circuit designs which are less susceptible to temperature, humidity or other environmental factors, or making careful adjustments to reduce error. Alternately, when stability in the steady state is emphasized, feedback control may be employed but by sacrificing fast response or by using devices which can withstand even the high voltages at the peak of ringing. However, in either case, these disadvantages are not surmounted in essence, but rather they are often accompanied by sacrifices in performance or cost increases required to cover these disadvantages.

OBJECT OF THE INVENTION

In light of the above situation, the object of this invention is to provide a control method which combines the high-speed response of open-loop control with the excellent steady state stability of feedback control, and a controller for embodying this control method.

SUMMARY OF THE INVENTION

The control method of the present invention is a control method for controlling the output of a controlled system in response to a control value, comprising the steps of monitoring a controlled variable which is controlled by said controlled system, to find a monitor value which represents said controlled variable, and finding a differential value representing the difference between said control value and said monitor value and when said differential value exceeds a specified upper limit value, replacing said differential value with said upper limit value, and when said differential value drops below a specified lower limit value, replacing said differential value with said lower limit value, thus finding a clipped value which is said differential value clipped by said upper limit value and said lower limit value, and synthesizing said control value and said clipped value in such a way that said monitor value becomes negative feedback to said control value.

Furthermore, the controller of the present invention is a controller which is provided with a control signal as input and which controls the output of a controlled system in response to said control signal, characterized by being provided with a sensor which monitors a controlled variable which is controlled by said controlled system, and provides as output a monitor signal which represents said controlled variable, and a differential computing element which is provided with said monitor signal as input and provides as output a differential signal representing the difference between said control signal and monitor signal and a limiter which is provided with said differential signal as input, and which clips said differential signal to a specified upper limit value when said differential signal exceeds said upper limit value, and clips said differential signal to a specified lower limit value when said differential signal drops below said lower limit value, thus finding and providing as output a clipped signal which is said differential signal clipped by said upper limit value and said lower limit value, and a signal synthesizer which is provided with said control signal and said clipped signal as input, and which synthesizes said control signal and said clipped signal in such a way that said monitor signal becomes negative feedback to said control signal, and then provides as output a composite signal synthesized from said control signal and said clipped signal thus controlling the output of said controlled system based on said composite signal.

Where, if said control signal is represented by $V_S$, said monitor signal by $V_{CP}$, said differential signal by $V_D$, and said composite signal by $V_C$, said controlled variable P, to within any desired range of control, and a straight-line approximation Q, obtained by taking a straight-line approximation of said controlled variable P, can be represented as functions of composite signal $V_C$ with the equations $$P = K_x \cdot V_c + B_x + B_o \quad (15)$$

$$Q = K_x \cdot V_c + B_o \quad (16)$$

provided that
  $K_x$ is the slope of said straight-line approximation Q
  $B_x$ is the straight-line approximation error representing the difference P-Q between said controlled variable P and said straight-line approximation Q
and
  $B_0$ is a constant which represents the value of said straight-line approximation Q when $V_C = 0$, if the maximum value, averaged value and minimum value of the amplitude of variation of said slope $K_x$ are given by $K_{xMAX}$, $K_o$, and $K_{xMIN}$, respectively, the maximum positive value and maximum negative value of the amplitude of variation of said straight-line approximation error $B_x$ by Bhd xMAX and $B_{xMIN}$, respectively, said specified upper limit by $V_{LH}$, said specified lower limit by $V_{LL}$, in said sensor, a conversion coefficient $k_S$ for converting said controlled variable P into said monitor signal $V_{CP}$ is given by $$k_s = P/V_{cp} \quad (17)$$

the variable portion $V_K$ of said control signal $V_S$ at this time by $$V_K = V_s - k_s B_o \quad (18)$$

the amplification factor A of said differential computing element by $$A = |V_D/(V_s - V_{cp})| \quad (19)$$

when said differential computing element carries out the operation given by $$V_D = A \cdot (V_{cp} - V_s) \quad (23)$$

said limiter having said upper limit $V_{LH}$ and said lower limit $V_{LL}$ which satisfy relations $$0.3 \cdot \left[\left(\frac{K_{xMAX}}{K_o} - 1\right) \cdot V_K + \frac{B_{xMAX}}{K_o}\right] \leq V_{LH} \leq 1.3 \cdot \quad (24)$$

$$\left[\left(\frac{K_{xMAX}}{K_o} - 1\right) \cdot V_K + \frac{B_{xMAX}}{K_o}\right]$$

and $$1.3 \cdot \left[\left(\frac{K_{xMIN}}{K_o} - 1\right) \cdot V_K + \frac{B_{xMIN}}{K_o}\right] \leq V_{LL} \leq 0.3 \cdot \quad (25)$$

$$\left[\left(\frac{K_{xMIN}}{K_o} - 1\right) \cdot V_K + \frac{B_{xMIN}}{K_o}\right]$$

and when said differential computing element carries out the operation given by $$V_D = A \cdot (V_s - V_{cp}) \quad (26)$$

said limiter having said upper limit $V_{LH}$ and said lower limit $V_{LL}$ which satisfy relations $$-0.3 \cdot \left[\left(\frac{K_{xMIN}}{K_o} - 1\right) \cdot V_K + \frac{B_{xMIN}}{K_o}\right] \leq V_{LH} \leq -1.3 \cdot \quad (27)$$

$$\left[\left(\frac{K_{xMIN}}{K_o} - 1\right) \cdot V_K + \frac{B_{xMIN}}{K_o}\right]$$

and $$-1.3 \cdot \left[\left(\frac{K_{xMAX}}{K_o} - 1\right) \cdot V_K + \frac{B_{xMAX}}{K_o}\right] \leq V_{LL} \leq -0.3 \cdot \quad (28)$$

$$\left[\left(\frac{K_{xMAX}}{K_o} - 1\right) \cdot V_K + \frac{B_{xMAX}}{K_o}\right]$$

is preferable.

Furthermore, the controller of the invention is preferably provided with low-pass filters for oscillation prevention at least one location: between said sensor and said differential computing element, between said differential computing element and said limiter, or between said limiter and said signal synthesizer.

Here, the "controlled system" is defined to be a system which controls a controlled variable (to be defined hereafter), such as said motor, valve, etc. described above, but not limited to a particular system.

The "controlled variable" is defined to be a variable which is ultimately controlled, such as said tape speed, water level, etc. described above, but not limited to a particular variable.

The "output of the controlled system" is defined to be that output which is provided from the controlled system to the object of control, e.g., speed of revolution of a motor, opening of a valve, which differs depending on the controlled system.

The output of the controlled system, e.g. the speed of revolution of a motor, may be the ultimate object of control, namely the controlled variable, so the present invention covers both the case in which the output of the controlled system and the controlled variable are identical, and the case in which they are different as in the control of the water level height described above.

Even if the output of the controlled system and the controlled variable are different, the above "monitor value which represents the controlled variable" or "monitor signal which represents the controlled variable" need not be a monitor value or monitor signal found by measuring a directly controlled variable, e.g. tape speed, but rather it may be a monitor value or monitor signal found by monitoring an essentially controlled value, e.g. measuring the motor speed instead of the tape speed if there is a unique relationship between the speed of revolution of the motor axle and the tape speed to within a specified accuracy.

The above "differential value" ("differential signal") may be found by subtracting the monitor value (monitor signal) from the control value (control signal), or by subtracting the control value (control signal) from the monitor value (monitor signal).

The phrase "in such a way that said monitor value (monitor signal) becomes negative feedback to said control value (control signal)" means that the monitor value (monitor signal), when converted to a differential value (differential signal) and then a clipped value (clipped signal) and then combined with the control value, forms negative feedback.

The phrase "within any desired range of control" is defined to be the range over which effective control can be expected, for example, in the case of controlling temperatures, if the temperature is to be controlled between 0° C. and 50° C., this temperature range 0° C.–50° C. is the desired range of control.

The "averaged value $K_o$" above does not necessarily mean the arithmetic mean, but rather the design standard value of slope $K_x$ when the controller of the invention is embodied.

While the various signals described above are indicated as voltage signals for illustrative purposes, they are not limited to being voltage signals. Part or all of the signals could be current signals and in fact, they need not even be electrical signals since optical and other types of signals are also permissible.

The "amplitude of variation of said slope $K_x$" and "amplitude of variation of said straight-line approximation error $B_x$" need not be the maximum amplitude of variation considering all possible states, but rather they may be the amplitude of variation over which effective control can be expected in spite of variation when the controller of the invention is embodied.

OPERATION OF THE INVENTION

The control method of the invention comprises both open-loop control and feedback control carried out simultaneously, so this control method includes characteristics of both open-loop control and feedback control. The control method of the invention is characterized by suppressing the disadvantages of both open-loop control and feedback control while bringing out the advantages of both. In the control method of the invention, the differential value characteristic of feedback control is found, and then a clipped value is found from this differential value by clipping this differential value to a specified upper limit and a specified lower limit, so that the ringing which occurs during feedback control can be suppressed to a sufficiently small degree. Furthermore, this clipped value and the control value are synthesized in such a way that the monitor signal becomes negative feedback to said control signal. Since the output of the controlled system is controlled based on a composite value found by means of this synthesis, response lag, one of the disadvantages of feedback control, will be solved since the high-speed response characteristic of open-loop control will be exhibited, while at the same time, the stability in a steady state situation characteristic of feedback control will also be exhibited.

Furthermore, the controller of the invention is a device embodying the above control method of the invention, characterized by being provided with a differential computing element which finds the differential signals characteristic of feedback control, a limiter which finds a clipped signal which is the differential signal clipped to a specified upper limit value and specified lower limit value, and a signal synthesizer which finds a synthesized signal made by synthesizes the control signal and clipped signal in such a way that the monitor signal becomes negative feedback to said control signal, and then controls the output of the controlled system based on this composite signal, thus it is provided with high-speed response yet also provided with sufficiently high stability during the steady state, thus comprising a controller provided with the advantages of both open loop control and feedback control.

While detailed calculations are illustrated in the preferred embodiments to be described hereafter, when the sensor described above has a conversion coefficient $k_S$ defined in equation (17) which satisfies equation (20), the differential computing element will not be saturated over the entire controlled region, resulting in optimal feedback control.

Here, the amplification factor of the differential computing element is normally set at a sufficiently large value, so in this case, equation (20) becomes $$k_s \approx \frac{1}{K_o} \qquad (29)$$

provided that $k_S$ is preferably $1/K_0$.

Furthermore, a construction in which the limiter is given an upper limit $V_{LH}$ and a lower limit $V_{LL}$ fixed to, for example, specified constant values regardless of the value of the control signal $V_S$ would be valid for cases in which changes in $V_S$ are small or the tolerance or control error is large. However, a construction of the limiter in which $\alpha_H$, $\beta_H$, $\alpha_L$, $\beta_L$ are constants which satisfy equations (21) and (22)

$$V_{LH} = \alpha_H \cdot V_S + \beta_H (\alpha_H > 0) \qquad (21)$$

$$V_{LL} = \alpha_L \cdot V_S + \beta_L (\alpha_L < 0) \qquad (22)$$

would allow the construction of a controller in which, even if the control signal $V_S$ would change, open-loop control and feedback control can make valid contributions over the total range of changes in the control signal $V_S$, comprising a preferred embodiment of this invention.

While the derivation of the equations are illustrated in the preferred embodiments to be described later, when the differential computing element carries out the operations of equation (23)

$$V_D = A \cdot (V_{cp} - V_s) \qquad (23)$$

and the upper limit $V_{LH}$ and lower limit $V_{LL}$ satisfy the relations $$0.3 \cdot \left[\left(\frac{K_{xMAX}}{K_o} - 1\right) \cdot V_K + \frac{B_{xMAX}}{K_o}\right] \leq V_{LH} \leq 1.3 \cdot \qquad (30)$$

$$\left[\left(\frac{K_{xMAX}}{K_o} - 1\right) \cdot V_K + \frac{B_{xMAX}}{K_o}\right]$$

$$1.3 \cdot \left[\left(\frac{K_{xMIN}}{K_o} - 1\right) \cdot V_K + \frac{B_{xMIN}}{K_o}\right] \leq V_{LL} \leq 0.3 \cdot \qquad (31)$$

$$\left[\left(\frac{K_{xMIN}}{K_o} - 1\right) \cdot V_K + \frac{B_{xMIN}}{K_o}\right]$$

respectively, or when the differential computing element carries out the operations of equation (26)

$$V_D = A \cdot (V_s - V_{cp}) \qquad (26)$$

and the upper limit $V_{LH}$ and lower limit $V_{LL}$ each satisfy the relations $$-0.3 \cdot \left[\left(\frac{K_{xMIN}}{K_o} - 1\right) \cdot V_K + \frac{B_{xMIN}}{K_o}\right] \leq V_{LH} \leq -1.3 \cdot \qquad (32)$$

$$\left[\left(\frac{K_{xMIN}}{K_o} - 1\right) \cdot V_K + \frac{B_{xMIN}}{K_o}\right]$$

-continued $$-1.3 \cdot \left[\left(\frac{K_{xMAX}}{K_o} - 1\right) \cdot V_K + \frac{B_{xMAX}}{K_o}\right] \leq V_{LL} \leq -0.3 \cdot \quad (33)$$

$$\left[\left(\frac{K_{xMAX}}{K_o} - 1\right) \cdot V_K + \frac{B_{xMAX}}{K_o}\right]$$

respectively, the controller of this invention is sufficiently endowed with advantages of both open-loop control and feedback control. Note that the ranges of equations (30) and (31) and equations (32) and (33) are only recommendations for practical use so depending on the use, as long as this invention is valid even if these ranges would be exceeded, the above ranges are not restrictive.

If the controller of the invention is further provided with a low-pass filter for oscillation prevention, its operation will be even more stable, becoming a device of high reliability.

PREFERRED EMBODIMENTS OF THE INVENTION

Figure 1:
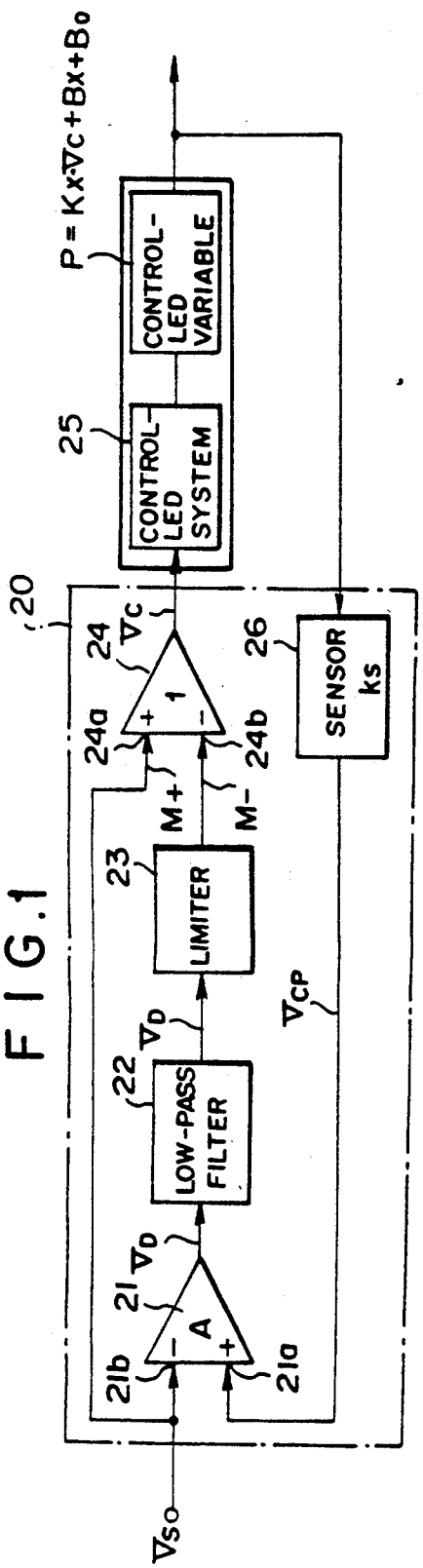
FIG. 1 is a block diagram illustrating a preferred embodiment of the invention.

Here follows detailed descriptions of the preferred embodiments of the invention. Note that as is clear from the description up to now, the controlled system and controlled variable of this invention are not limited to any particular system or variable, so they will be merely called the controlled system and controlled variable. Furthermore, while the various signals in the invention are not limited to voltage signals, the various signals will be described here as if they were voltage signals, and for simplicity, the same symbols used to describe signals in general, not limited to the voltage signals, will be used but this in no way limits this invention to the use of voltage signals. FIG. 1 is a block diagram illustrating one example of the preferred embodiment of the controller of the invention.

Output from a control computer or the like (not shown) in the form of a controlled control signal $V_S$ is provided as input to the negative input terminal $21b$ of differential computing element 21 of this controller 20. A monitor signal $V_{CP}$ representing the controlled variable P monitored by sensor 26 is provided as input to the positive input terminal $21a$. The output of differential computing element 21 is a differential signal $V_D$ found by calculating the difference between control signal $V_S$ and monitor signal $V_{CP}$ and then multiplying this difference by A, as shown by equation (23) above $$V_D = A \cdot (V_{cp} - V_s) \quad (23)$$

This differential signal $V_D$, after passing through a low-pass filter 22, is provided as input to limiter 23. The low-pass filter 22, used for oscillation prevention in the same manner as in the feedback control system (see FIG. 18) described earlier, but in the frequency bands of concern here, the differential signal $V_D$ provided as output from differential computing element 11 will be provided unaltered as input to the limiter 23. Limiter 23 clips differential signal $V_D$ to an upper limit $V_{LH}$ when the differential signal $V_D$ exceeds this upper limit $V_{LH}$ and clips differential signal $V_D$ to a lower limit $V_{LL}$ when the differential signal $V_D$ drops below this lower limit $V_{LL}$, thus finding and providing as output a clipped signal which is said differential signal clipped by said upper limit value and said lower limit value. This limiter 23 will be described in detail hereafter. The output signal from limiter 23 is provided as input to the negative input terminal $24b$ of a signal synthesizer 24. Control signal $V_S$ is provided as input to the positive input terminal $24a$ of this signal synthesizer 24 directly. Here, the signals provided to the positive input terminal $24a$ and negative input terminal $24b$ of this signal synthesizer 24 will be called $M_+$ and $M_-$ respectively. This signal synthesizer 24 serves to find the difference between $M_+$ and $M_-$ and provide as output a composite signal $V_C$ found by $$V_c = M_+ - M_- \quad (34)$$

Note that in this preferred embodiment, the amplification factor of the signal synthesizer 24 is set to 1. This composite signal $V_C$ is provided to the controlled system 25 as input, so that the output of the controlled system 25 and eventually the controlled variable P is controlled based on this composite signal $V_C$. Note that as described earlier, the output of the controlled system 25 is sometimes the same and sometimes different than the controlled variable P. This controlled variable P and its straight-line approximation Q are represented by $$P = K_x \cdot V_c + B_x + B_o \quad (15)$$

$$Q = K_x \cdot V_c + B_o \quad (16)$$

provided that $K_x$ is the slope of said straight-line approximation Q, $B_x$ is the straight-line approximation error representing the difference P-Q between said controlled variable P and said straight-line approximation Q and $B_0$ is a constant which represents the value of said straight-line approximation Q when $V_C=0$. Here these equations (15) and (16) are identical to equations (2) and (3) with the exception that $V_C$ is used instead of $V_S$ as the variable. Since $K_x$, $B_x$, and $B_0$ in these equations (15) and (16) have already been explained with reference to FIG. 9 and FIGS. 13 through 16 with respect to equations (2) and (3), so a detailed explanation will be omitted here.

The controlled variable P is monitored by sensor 26 which generates a monitor signal $V_{CP}$. This monitor signal $V_{CP}$ is expressed in the same manner as equation (10) by $$V_{cp} = k_s P \quad (35)$$

with a conversion coefficient of $k_s$.

Figure 2:
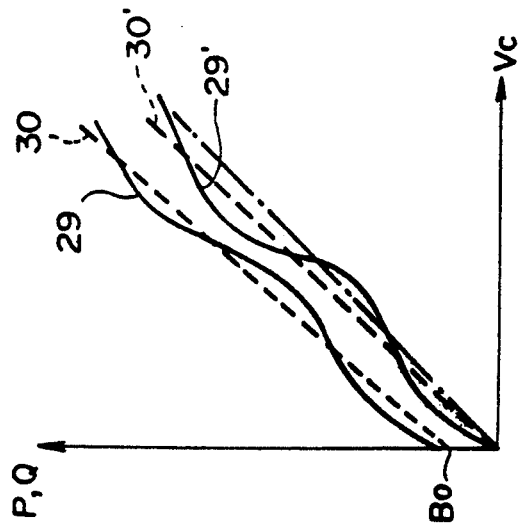
FIG. 2 is a diagram illustrating an example of the shape of controlled variable P and its straight-line approximation Q as functions of $V_C$.

FIG. 2 is a diagram illustrating an example of the shape of controlled variable P and its straight-line approximation Q as functions of composite signal $V_C$ on the horizontal axis.

The controlled variable P and its straight-line approximation Q typically have a $B_0$ ($\neq 0$) when $V_C=0$ as indicated by curve 29 and straight line 30. Curve 29' and straight line 30' indicate controlled variable P and its straight-line approximation Q when $B_0 \neq 0$. In the following explanation, the case of $B_0=0$ will be described first, and then expanded to the general case which includes $B_0 \neq 0$. Note that even if $B_0=0$, the slope $K_x$ may be different from the ideal slope $K_0$, and the straight-line approximation error $B_x$ also need not be zero, but rather the only difference from the general case is that $B_0=0$.

When $B_0=0$, from equation (35), $$V_{cp} = k_s \cdot (K_x \cdot V_c + B_x) \qquad (36)$$
$$= k_s \cdot K_x \cdot V_c + k_s \cdot B_x$$

which, when the definitions $$k_x = k_s K_x \qquad (37)$$

$$b_x = k_s B_x \qquad (38)$$

are used, becomes $$V_{cp} = k_x \cdot V_c + b_x \qquad (39)$$

The output voltage (differential signal) $V_D$ of differential computing element 21 at this time is, from equation (23), $$V_D = A \cdot (V_{cp} - V_s) \qquad (40)$$
$$= A \cdot (k_x \cdot V_c + b_x - V_s)$$

Here follows a description of the case in which a differential signal $V_D$ provided through low-pass filter 22 as input to limiter 23 passes through the limiter 23 without being clipped by the limiter 23, and a description of the method of determining the upper limit and lower limit of limiter 23. When differential signal $V_D$ passes through limiter 23 without being clipped by the limiter 23, from equation (34), $$V_c = M_+ - M_- \qquad (41)$$
$$= V_s - A \cdot (k_x \cdot V_c + b_x - V_s)$$

$$\therefore V_c = \frac{1+A}{1+A \cdot k_x} \cdot V_s - \frac{A \cdot b_x}{1+A \cdot k_x}$$

in which the amplification factor A of differential computing element 21 is set to be $$A \geq 10 \qquad (12)$$

or another sufficiently large value, so from equation (41), the composite signal $V_C$ is expressed by $$V_c = \frac{V_s - b_x}{k_x} \qquad (42)$$

Note that when differential signal $V_D$ passes through limiter 23 without being clipped by the limiter 23, or specifically, when feedback control is completely effective, the controlled variable P, from equations (37), (38) and (42), is found by the equation $$P = K_x \cdot V_c + B_x \qquad (43)$$
$$= K_x \cdot \frac{V_s - b_x}{k_x} + B_x$$
$$= \frac{V_s}{k_s} - \frac{k_s \cdot B_x}{k_s} + B_x$$
$$= \frac{V_s}{k_s}$$

This is to say that the controlled variable P is proportional to the control signal $V_S$, and therefore the constant error $\Delta P_0$ (see FIG. 17B) does not occur.

At this time, equations (35) and (43) result in $$V_{cp} = k_s \cdot P \qquad (44)$$
$$= V_s$$

So in the steady state, control signal $V_S$ is equal to monitor signal $V_{CP}$.

Here, the differential computing element 21 carries out the operation expressed in FIG. (23)

$$V_D = A \cdot (V_{cp} - V_s) \qquad (23)$$

and since the amplification factor A is set to be a sufficiently large value as described above, by adjusting the conversion coefficient $k_S$ of sensor 26, the situation $V_{CP} = V_S$ and consequently $V_D = 0$ can be induced. At this time, from equation (31), $$V_c = M_+ - M_- \qquad (45)$$
$$= V_s - V_D$$
$$\approx V_s$$
$$\approx V_{cp}$$

and substituting into equation (39) gives $$V_c \approx k_x \cdot V_c + b_x$$

so $$(k_x - 1) \cdot V_c + b_x \approx 0 \qquad (46)$$

and in order for equation (46) to hold in the steady state, the relations $$k_x \approx 1 \qquad (47)$$

$$b_x \approx 0 \qquad (48)$$

must hold.

From equation (37)

$$k_x = k_s K_x \qquad (37)$$

and if the averaged value of $K_x$ given by $K_0$, the averaged value of $k_x$, $\overline{k_x}$ becomes $$\overline{k_x} = k_s \cdot K_o \qquad (49)$$

Comparing equations (47) and (49), setting $$\overline{k_s} = \frac{1}{K_o} \qquad (50)$$

gives $$\overline{k_x} = 1 \qquad (51)$$

This is to say, equation (47) holds.
From equation (38), $$b_x = k_s B_x \qquad (38)$$

and since the straight-line approximation error $B_x$ is the difference between controlled variable P and its straight-line approximation Q, as an average, $B_x=0$. Therefore, the average of $b_x$, $\bar{b}_x$ also becomes $$\bar{b}_x = k_s \overline{B_x} = 0 \tag{52}$$

so equation (48) is always true.

From equation (51), $\bar{k}_x = 1$, meaning that $k_x$ takes a value near 1. Therefore, resulting in $$k_x = 1 + \Delta k_x \tag{53}$$

$$\Delta k_x \ll 1 \tag{54}$$

Substituting equation (53) into equation (42) gives $$V_c = \frac{V_s - b_x}{1 + \Delta k_x} \tag{55}$$

Using equation (54), equation (55) is transformed to $$\begin{aligned} V_c &\approx (V_s - b_x) \cdot (1 - k_x) \\ &= V_s - \Delta k_x \cdot V_s - b_x + b_x \cdot \Delta k_x \\ &\approx V_s - (\Delta k_x \cdot V_s + b_x) \end{aligned} \tag{56}$$

From equation (34), since $$\begin{aligned} V_c &= M_+ - M_- \\ &= V_s - M_- \end{aligned}$$

a comparison with (56) results in $$M_- = \Delta k_x \cdot V_s + b_x \tag{57}$$

If the ranges of $\Delta k_x$ and $b_x$ are given by $$-k_L \leq \Delta k_x \leq k_H \tag{58}$$

$$-\Delta V_{BL} \leq b_x \leq \Delta V_{BH} \tag{59}$$

from equation (57), and the upper limit $V_{LH}$ and lower limit $V_{LL}$ of the limiter 23 are determined by $$V_{LH} = k_H \cdot V_s + \Delta V_{BH} \tag{60}$$

$$V_{LL} = -(k_L \cdot V_s + \Delta V_{BL}) \tag{61}$$

then during the steady state, differential signal $V_D$ will pass through limiter 23 without being clipped over its entire range. Therefore, total compensation is possible in the steady state, so the constant error $\Delta P_0$ (see FIG. 17B) of open-loop control does not occur.

As described above, $K_0$ is the averaged value of $K_x$, so if $$K_x = K_0(1 + \Delta K_x) \tag{62}$$

from equation (50), $k_S = 1/K_0$, so from equation (37), $$\begin{aligned} k_x &= k_s \cdot K_x \tag{63} \\ &= \frac{K_x}{K_0} \\ &= \frac{K_0 \cdot (1 + \Delta K_x)}{K_0} \\ &= 1 + \Delta K_x \end{aligned}$$

Upon comparing equations (63) and (53), $$\Delta k_x = \Delta K_x \tag{64}$$

If the maximum and minimum values of $K_x$ are $K_{xMAX}$ and $K_{xMIN}$, respectively, from equations (58), (59) and (64), $$K_{xMAX} = K_0 \cdot (1 + k_H)$$

$$K_{xMIN} = K_0 \cdot (1 - k_L)$$

$$\therefore k_H = \frac{K_{xMAX}}{K_0} - 1 \tag{65}$$

$$k_L = -\left(\frac{K_{xMIN}}{K_0} - 1\right) \tag{66}$$

And from equations (38) and (50), $$b_x = k_s \cdot B_x = \frac{B_x}{K_0} \tag{67}$$

If the maximum positive and maximum negative values of $B_x$ are $B_{xMAX}$ and $B_{xMIN}$, respectively, from equations (59) and (67), $$\Delta V_{BH} = \frac{B_{xMAX}}{K_0} \tag{68}$$

$$-\Delta V_{BL} = \frac{B_{xMIN}}{K_0} \tag{69}$$

Therefore, from equations (60), (61), (65), (66), (68), and (69), the upper limit $V_{LH}$ and lower limit $V_{LL}$ of the limiter 23 become $$V_{LH} = k_H \cdot V_s + \Delta V_{BH} = \left(\frac{K_{xMAX}}{K_0} - 1\right) \cdot V_s + \frac{B_{xMAX}}{K_0} \tag{70}$$

$$V_{LL} = -(k_L \cdot V_s + \Delta V_{BL}) = \left(\frac{K_{xMIN}}{K_0} - 1\right) \cdot V_s + \frac{B_{xMIN}}{K_0} \tag{71}$$

At this time, if the maximum and minimum values of composite signal $V_C$ are $V_{cMAX}$ and $V_{cMIN}$, respectively, from equation (34), $$\begin{aligned} V_{cMAX} &= V_s - V_{LL} \tag{72} \\ &= V_s - \left(\frac{K_{xMIN}}{K_0} - 1\right) \cdot V_s - \frac{B_{xMIN}}{K_0} \\ &= \left(2 - \frac{K_{xMIN}}{K_0}\right) \cdot V_s - \frac{B_{xMIN}}{K_0} \end{aligned}$$

$$\begin{aligned} V_{cMIN} &= V_s - V_{LH} \tag{73} \\ &= V_s - \left(\frac{K_{xMAX}}{K_0} - 1\right) \cdot V_s - \frac{B_{xMAX}}{K_0} \\ &= \left(2 - \frac{K_{xMAX}}{K_0}\right) \cdot V_s - \frac{B_{xMAX}}{K_0} \end{aligned}$$

And since $\bar{k}_x = 1$ from equation (51), and $\bar{b}_x = 0$ from equation (52), as an average, the composite signal $V_C$ becomes, from equation (56), $$V_c \approx V_S \quad (74)$$

Figure 3A:
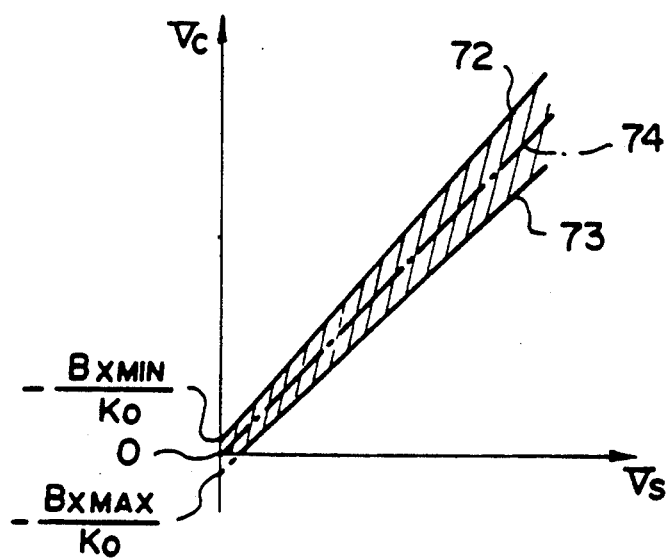
FIG. 3A is a diagram illustrating the range of composite signal $V_C$ with respect to control signal $V_S$.

FIG. 3A is a diagram illustrating equations (72), (73), and (74) above. The numbers of the solid lines in this diagram correspond to the numbers of equations (72) through (74). By determining an upper limit $V_{LH}$ and a lower limit $V_{LL}$ so that the composite signal $V_C$ remains within the range (indicated by hatching on the diagram) centered about control signal $V_S$ (see equation (74)) and bounded by equations (72) and (73), even if $K_x$ and $B_x$ would vary to the largest degree, no constant error $\Delta P_0$ (see FIG. 17B) will occur.

If the maximum value, averaged value and minimum value of the controlled variable P are $P_{MAX}$, $\overline{P}$, and $P_{MIN}$, respectively, when $B_0 = 0$, from equations (15), (72), (73), and (74), $$\begin{aligned} P_{MAX} &= K_{xMAX} \cdot V_{cMAX} + B_{xMAX} \quad (75)\\ &= K_{xMAX} \cdot \left[\left(2 - \frac{K_{xMIN}}{K_o}\right) \cdot V_s - \frac{B_{xMIN}}{K_o}\right] + B_{xMAX} \\ &= K_{xMAX} \cdot \left(2 - \frac{K_{xMIN}}{K_o}\right) \cdot V_s + \\ &\quad \left(B_{xMAX} - \frac{K_{xMAX} \cdot B_{xMIN}}{K_o}\right) \end{aligned}$$

$$\overline{P} = K_o \cdot V_s \quad (76)$$

$$\begin{aligned} P_{MIN} &= K_{xMIN} \cdot \left[\left(2 - \frac{K_{xMAX}}{K_o}\right) \cdot V_s - \frac{B_{xMAX}}{K_o}\right] + B_{xMIN} \quad (77)\\ &= K_{xMIN} \cdot \left(2 - \frac{K_{xMAX}}{K_o}\right) \cdot V_s + \\ &\quad \left(B_{xMIN} - \frac{K_{xMIN} \cdot B_{xMAX}}{K_o}\right) \end{aligned}$$

Figure 3B:
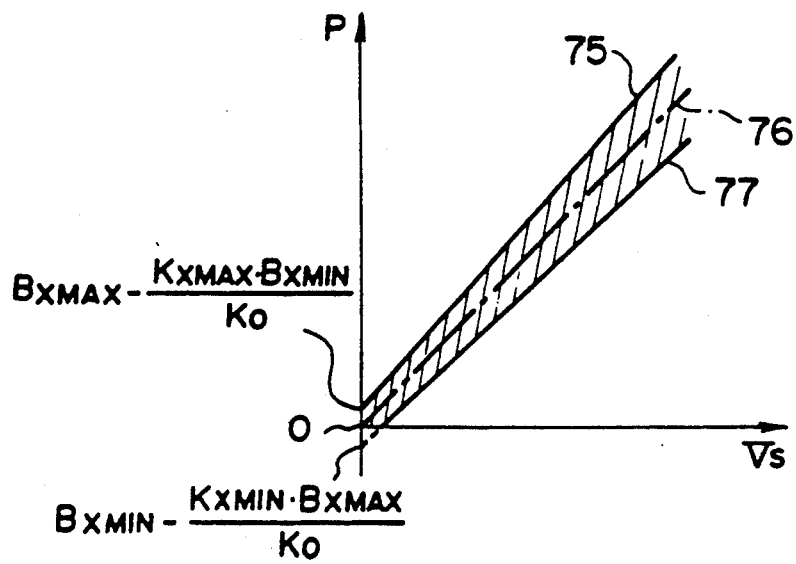
FIG. 3B is a diagram illustrating the range of controlled variable P with respect to control signal $V_S$.

FIG. 3B is a graphical representation of these equations (75), (76, and (77). The numbers of the solid lines in this diagram correspond to the numbers of equations (75) through (77). By setting the upper limit $V_{LH}$ and lower limit $V_{LL}$ of limiter 12 as in FIGS. (70) and (71), the controlled variable P will not be subject to ringing which occurs during transient response, nor will it stray from the hatched region, and in the steady state, it will be controlled to follow a straight line 76 so no constant error $\Delta P_0$ (see FIG. 17B) will occur.

In passing, equations (70) and (71) above indicate the absolute upper limit $V_{LH}$ and lower limit $V_{LL}$ of the range in which feedback control is completely effective, but even if the actual upper and lower limits were as specified by $$V_{LH} \geq \left(\frac{K_{xMAX}}{K_o} - 1\right) \cdot V_s + \frac{B_{xMAX}}{K_o} \quad (78)$$

$$V_{LL} \leq \left(\frac{K_{xMIN}}{K_o} - 1\right) \cdot V_s + \frac{B_{xMIN}}{K_o} \quad (79)$$

or rather, even if the range indicated by hatching on the diagram is enlarged further, this is no problem at all with feedback control being completely effective. However, if the hatched regions on FIGS. 3A and 3B are expanded, the effect of suppressing ringing in the transient state will be reduced and this would not be preferable. Therefore, for practical purposes, a range in which the expansion of the above hatched regions is limited to a tolerance of 30%, or specifically the case when $$1.3 \cdot \left[\left(\frac{K_{xMAX}}{K_o} - 1\right) \cdot V_s + \frac{B_{xMAX}}{K_o}\right] \geq V_{LH} \quad (80)$$

$$1.3 \cdot \left[\left(\frac{K_{xMIN}}{K_o} - 1\right) \cdot V_s + \frac{B_{xMIN}}{K_o}\right] \leq V_{LL} \quad (81)$$

is preferable. However, if the tolerance for ringing is large, equations (80) and (81) need not be satisfied.

Next, consider the case when the hatched regions on FIGS. 3A and 3B are narrower than the ranges represented in equations (72) through (74) and equations (75) through (77), or specifically the case when $$\left(\frac{K_{xMAX}}{K_o} - 1\right) \cdot V_s + \frac{B_{xMAX}}{K_o} > V_{LH} \quad (82)$$

$$\left(\frac{K_{xMIN}}{K_o} - 1\right) \cdot V_s + \frac{B_{xMIN}}{K_o} < V_{LL} \quad (83)$$

This invention acts effectively even in this case. Namely, nearly all variation of $K_x$ and $B_x$ will be near the center of the ranges from $K_{xMAX}$ to $K_{xMIN}$ and from $B_{xMAX}$ to $B_{xMIN}$, or specifically $K_x = K_o$ and $B_x = 0$. Therefore, when near the center, feedback control is completely effective. Furthermore if $K_x = K_{xMAX}$, or $B_x = B_{xMAX}$ or another case in which the values are on the extreme of the above ranges from $K_{xMAX}$ to $K_{xMIN}$ and from $B_{xMAX}$ to $B_{xMIN}$ a larger and larger constant error $\Delta P_o$ (see FIG. 17B) will remain as the hatched regions on FIGS. 3A and 3B become narrower and narrower. However, on the other hand, as these hatched regions are made narrower and narrower, ringing during transient response will be suppressed to a lower and lower level. So depending on the application, there may be cases in which greater ringing suppression is desired in spite of a certain amount of constant error $\Delta P_o$. In this case, narrowing the hatched regions would be more effective. However, if the hatched regions are made too narrow, feedback control will be virtually unable to work effectively and the system will be virtually identical to open-loop control, so for practical purposes in most applications, the ranges $$0.3 \cdot \left[\left(\frac{K_{xMAX}}{K_o} - 1\right) \cdot V_s + \frac{B_{xMAX}}{K_o}\right] \leq V_{LH} \quad (84)$$

and $$0.3 \cdot \left[\left(\frac{K_{xMIN}}{K_o} - 1\right) \cdot V_s + \frac{B_{xMIN}}{K_o}\right] \geq V_{LL} \quad (85)$$

are effective. However, these ranges may be exceeded if open-loop control is sufficient but a certain amount of feedback control is desired.

Consequently, virtually all of the cases in which this invention can act effectively are, from equations (80), (81), (84), and (85), included in the ranges $$0.3 \cdot \left[\left(\frac{K_{xMAX}}{K_o} - 1\right) \cdot V_s + \frac{B_{xMAX}}{K_o}\right] \leq V_{LH} \leq \quad (86)$$

$$1.3 \cdot \left[\left(\frac{K_{xMAX}}{K_o} - 1\right) \cdot V_s + \frac{B_{xMAX}}{K_o}\right]$$

$$1.3 \cdot \left[\left(\frac{K_{xMIN}}{K_o} - 1\right) \cdot V_s + \frac{B_{xMIN}}{K_o}\right] \leq V_{LL} \leq \quad (87)$$

$$0.3 \cdot \left[\left(\frac{K_{xMIN}}{K_o} - 1\right) \cdot V_s + \frac{B_{xMIN}}{K_o}\right]$$

Now the tolerance limits for conversion coefficient $k_S$ of sensor 26 will be found. These tolerance limits are conditional on differential computing element 21 being not saturated. The upper limit voltage and lower limit voltage of differential computing element 21 (maximum and minimum values of differential signal $V_D$ obtained as output from differential computing element 21) are symbolized as $V_{DMAX}$ and $V_{DMIN}$, respectively.

From equation (40), the absolute value $|V_D|$ of differential voltage (differential signal) $V_D$ is found by $$|V_D| = A \cdot |k_S \cdot V_C + b_X - V_s|$$

and substituting this into equation (37) gives $$|V_D| = A \cdot |k_S \cdot K_x \cdot V_c + b_X - V_s| \quad (88)$$

and since $k_S$ changes ($k_S \to k_S + \Delta k_S$), the change in $V_D$, $\Delta V_D$ becomes $$|\Delta V_D| = A \cdot K_x \cdot |V_c| \cdot |\Delta k_S| \quad (89)$$

Since the differential signal $V_D$ is a signal which represents the difference between control signal $V_S$ and monitor signal $V_{cp}$, the relationship $$|V_D| << |V_s| \quad (90)$$

is typical. Therefore, from equation (34), composite signal $V_C$ becomes $$|V_c| = |M_+ - M_-| \quad (91)$$
$$= |V_s - V_D|$$
$$\approx |V_s|$$

If $|V_S|_{MAX}$ represents the maximum value of the absolute value of control voltage $V_S$, then from equation (91), $$|V_c| \approx |V_s| \leq |V_s|_{MAX} \quad (92)$$

Wherefore equation (89) becomes $$|\Delta V_D| = A \cdot K_x \cdot |V_c| \cdot |\Delta k_S| \approx A K_x \cdot |V_s|_{MAX} \cdot |\Delta k_S| \quad (93)$$

If the averaged value (design standard value) of $K_x$ is $K_o$, equation (93) becomes $$|\Delta V_D| \approx A K_x \cdot |V_s|_{MAX} \cdot |\Delta k_S| \approx A K_o \cdot |V_s|_{MAX} \cdot |\Delta k_S| \quad (94)$$

The condition of differential computing element 21 being not saturated requires that the maximum value $|\Delta V_D|_{MAX}$ of $|\Delta V_D|$ in the right side of equation (94) satisfy the relation $$|\Delta V_D|_{MAX} \leq V_{DMAX} - V_{DMIN} \quad (95)$$

Substituting (94) into (95) gives $$A \cdot K_o \cdot |V_s|_{MAX} \cdot |\Delta k_S| \leq V_{DMAX} - V_{DMIN} \quad (96)$$

$$\therefore |\Delta k_S| \leq \frac{V_{DMAX} - V_{DMIN}}{A \cdot K_o \cdot |V_s|_{MAX}}$$

The optimal value $\bar{k}_S$ of $K_S$ is represented, as described above, by equation (50)

$$\bar{k}_s = \frac{1}{K_o} \quad (50)$$

Substituting this into equation (96) gives $$|\Delta k_s| = |k_s - \bar{k}_s| \quad (97)$$
$$= \left|k_s - \frac{1}{K_o}\right|$$
$$\leq \frac{V_{DMAX} - V_{DMIN}}{A \cdot K_o \cdot |V_s|_{MAX}}$$

$$\therefore \frac{1}{K_o} \cdot \left(1 - \frac{V_{DMAX} - V_{DMIN}}{A \cdot |V_s|_{MAX}}\right)$$
$$\leq k_s \leq \frac{1}{K_o} \cdot \left(1 + \frac{V_{DMAX} - V_{DMIN}}{A \cdot |V_s|_{MAX}}\right)$$

If conversion coefficient $k_S$ of sensor 26 satisfies this equation (97), the differential computing element 21 can carry out effective control without becoming saturated. Here, the amplification factor A is set to be a sufficiently large value as described above. As $A \to$ large, $k_S \to 1/K_o$ as shown in equation (50).

Now the general case in which $B_o \neq 0$ will be explained as illustrated by curve 29 in FIG. 2 representing an example of controlled variable P, and the straight line 30 representing its approximation image. In this case, considering control signal $V_S$ to have a bias portion $b_o$ given by $$b_o = k_s B_o \quad (98)$$

if control signal $V_S$ is considered to be a signal comprising a variable portion $V_K$ to which a bias portion $b_o$ is added, specifically, $$V_s = V_K + b_s \cdot B_o \quad (99)$$

as described hereafter, the controlled variable P becomes $$P = \frac{V_s}{k_s} \quad (100)$$

So with the exception of the controlled variable P being proportional to the control signal $V_S$, if the $V_S$ in the explanation up until now in which $B_o = 0$ is replaced by $V_K$, the explanation up until now will hold as is.

This is to say, from equations (35) and (15), since the monitor signal $V_{cp}$ is $$V_{cp} = k_s \cdot P \qquad (101)$$
$$= k_s \cdot (K_x \cdot V_c + B_x + B_o)$$

from equation (23), the differential signal $V_D$ becomes $$\begin{aligned} V_D &= A \cdot (V_{cp} - V_s) \qquad (102) \\ &= A \{k_s \cdot (K_x \cdot V_c + B_x + B_o) - \\ &\quad (V_K + k_s \cdot B_o)\} \\ &= A \cdot (k_x \cdot V_c + b_x + V_K) \end{aligned}$$

which is equivalent to equation (40) for the case of $B_o = 0$ if $V_S$ is replaced with $V_K$.

Furthermore, from equations (34), (99), and (102), the composite signal $V_C$ becomes $$\begin{aligned} V_c &= M_+ - M_- \qquad (103) \\ &= V_s - V_D \\ &= V_K + k_s \cdot B_o - \\ &\quad A \cdot (k_x \cdot V_c + b_x - V_K) \end{aligned}$$

$$\therefore V_c = \frac{1+A}{1+A \cdot k_x} \cdot V_K - \frac{A \cdot b_x - k_s \cdot B_0}{1+A \cdot k_x}$$

$$\approx \frac{V_k - b_x}{k_x}$$

which is equivalent to equation (42) for the case of $B_o$ if $V_S$ is replaced with $V_K$. At this time, from equations (15) and (103), the controlled variable P becomes $$\begin{aligned} P &= K_x \cdot V_c + B_x + B_0 \\ &= K_x \cdot \frac{V_k - b_x}{k_x} + B_x \cdot B_0 \\ &= \frac{V_s}{k_s} \end{aligned}$$

so the controlled variable P is proportional to control signal $V_S$. Specifically, since the controlled variable P also includes $B_o$ as a bias portion, it is proportional to control signal $V_S$ which includes $k_S \cdot B_o$. Since these bias portions cancel each other in the differential computing element 21, if $V_S$ is replaced by $V_K$, the explanation for the case of $B_o = 0$ holds without modification. While FIG. 3A will apply if the horizontal axis $V_S$ is read as $V_K$, the horizontal axis $V_S$ of FIG. 3B remains as $V_S$. Since all other equations derived so far, except those corresponding to equation (100), will apply if $V_S$ is read as $V_K$, equations thus rewritten are not illustrated here. The case of $B_0 = 0$ can also be considered as having a bias portion of zero, so in this case $V_S$ becomes merely equal to $V_K$, and the equations are applicable including the case of $B_0 = 0$.

The implementation of this replacement involves, when only the variable portion $V_K$ of control signal $V_S$ is provided as output from a control computer or the like (not shown), the provision of an adder which adds the bias portion $k_S \cdot B_o$ before this signal $V_K$ is provided as input to controller 20 shown in FIG. 1. After signal $V_S$ is generated by this adder, this signal $V_S$ is provided as input to controller 20. Alternatively, the control computer or the like may provide a control signal $V_S$ which includes the bias portion $k_S \cdot B_o$.

FIGS. 4A and 4B are diagrams which illustrate, respectively, the control signal $V_K$ (Only the variable portion. Since $V_S$ and $V_K$ only differ by the bias portion, there are cases in which no distinction is made.) provided as input to controller 20 shown in FIG. 1, and the transient response of controlled variable P. FIG. 4A illustrates the change of control signal $V_K$ from $V_K = 0$ to $V_K = V_{K0}$ in step-like fashion at time $t_0$.

As shown on FIG. 4B, controlled variable P rises in quick response to control signal $V_K$. The period indicated on the diagram as $T_1$ is a period over which only open-loop control is effective due to the response lag of feedback control. At this time, the constant error $\Delta P_0$ indicated on FIG. 17B characteristic of open-loop control appears. The period $T_2$ following $T_1$ is a period of transient response due to feedback control in which ringing occurs, but since limiter 23 acts effectively, the ringing is clipped to values corresponding to the upper and lower limits $V_{LH}$ and $V_{LL}$. Period $T_3$ is a period of stability after the ringing has been suppressed, in which feedback control works effectively and the constant error $\Delta P_0$ is cancelled and the controlled variable P becomes $P_0$ with respect to control signal $V_K$.

As shown in this FIG. 4B, the present invention effectively includes the advantages of both open-loop control and feedback control.

While the specific circuit mechanisms of the various blocks shown in FIG. 1 can be readily designed based on the detailed explanation up until now, an example of the circuit structure of limiter 23, one of the major characteristics of the present invention, will be described below.

FIG. 5 is a circuit diagram illustrating an example of the circuit structure of the limiter shown in FIG. 1. Note that for simplicity, the symbols ($R_1$, $R_2$, ... etc.) which represent the various resistors also represent the resistance values of these resistors.

A voltage signal $V_V$ is provided as input to the positive input terminal 31a of an operational amplifier 31 through a resistor $R_1$. This voltage signal $V_V$ is the control signal $V_K$ (only the variable portion). The positive input terminal 31a is also grounded through a resistor $R_2$. A voltage signal $V_{HC}$ is provided as input to the negative input terminal 31b of this operational amplifier 31 through a resistor $R_{01}$. Here, this voltage signal $V_{HC}$ is $-\Delta V_{BH}$ (see equation (59)). This negative input terminal 31b is also connected to its output terminal through a resistor $R_{02}$. Here, the resistors $R_{01}$ and $R_{02}$ have the same resistance value $R_0$.

A voltage signal $V_{LC}$ is provided as input to the positive input terminal 32a of operational amplifier 32 through a resistor $R_{B2}$. Here, this voltage signal $V_{LC}$ is $-\Delta V_{BL}$ (see equation (59)). The positive input terminal 32a is also grounded through a resistor $R_{A2}$. A control signal $V_K$ is provided as input to the negative input terminal 32b of operational amplifier 32 through a resistor $R_{A1}$. This negative input terminal 32b of this operational amplifier 32 is also connected to its output terminal through a resistor $R_{B1}$. Here, the resistors $R_{A1}$ and $R_{A2}$ have the same resistance value $R_A$, and the resistors $R_{B1}$ and $R_{B2}$ have the same resistance value $R_B$. The negative input terminals 33b and 34b of operational amplifiers 33 and 34 are connected to each other. A diode 35 is arranged between the output terminal 33c and negative input terminal 33b of operational amplifier 33 with its cathode 35b connected to output terminal 33c and its anode 35a connected to negative input terminal 33b. A diode 36 is arranged between the output terminal 34c and negative input terminal 34b of operational amplifier 34 with its cathode 36b connected to output terminal 34c and its anode 36a connected to negative input terminal 33b.

The point of connection of anode 35a of diode 35 and cathode 36b of diode 36 is connected to the positive input terminal 37a of operational amplifier 37. The negative input terminal 37b and output terminal 37c of operational amplifier 37 are directly connected. The positive input terminal 37a of operational amplifier 37 is connected through resistor $R_L$ to input terminal 38 of this limiter 20. The output terminal 37c of operational amplifier 37 is connected to output terminal 39 of this limiter 20.

In this limiter 20 connected as such, the output voltage $V_A$ of operational amplifier 31 is given by $$V_A = \frac{2R_2}{R_1 + R_2} \cdot V_k + \Delta V_{BH} \tag{104}$$

The output voltage $V_B$ of operational amplifier 32 is given by $$V_B = -\frac{R_B}{R_A} \cdot V_k - \Delta V_{BL} \tag{105}$$

and selecting the various resistors such that $$\frac{2R_2}{R_1 + R_2} = k_H \tag{106}$$

$$\frac{R_B}{R_A} = k_L \tag{107}$$

results in $$V_A = k_H \cdot V_K + \Delta V_{BH} \tag{108}$$

$$V_B = -(k_L \cdot V_K + \Delta V_{BL}) \tag{109}$$

where these voltage signals $V_A$ and $V_B$ correspond to the upper and lower limits $V_{LH}$ and $V_{LL}$ represented by equations (60) and (61) (applicable if $V_S$ is read as $V_K$).

When a differential signal $V_D$ is provided as input to the input terminal 38 of this limiter 23, if this differential signal $V_D$ lies in the range $$V_B \leq V_D \leq V_A$$

this voltage will be provided unchanged as output from the output terminal 39, but if $$V_D < V_B \text{ or } V_A < V_D$$

then $V_D$ will be clipped to $V_B$ or $V_A$, respectively, and then provided as output from output terminal 39. Therefore, an example of the limiter of this invention is constructed according to the circuit structure of FIG. 5.

The limiter described above is an example constructed based on the upper limit $V_{LH}$ and lower limit $V_{LL}$ being proportional to the variable portion $V_K$ of control signal $V_S$, and these upper and lower limits $V_{LH}$ and $V_{LL}$ are also proportional to control signal $V_S$ including the bias portion $k_S \cdot B_0$ (see equation (99)). Specifically, in the equations $$V_{LH} = k_H \cdot V_k + \Delta V_{BH} \tag{110}$$

$$V_{LL} = -(k_L \cdot V_k + \Delta V_{BL}) \tag{111}$$

which are equations (60) and (61) in which $V_S$ is replaced with $V_K$, from equation (99), $$V_k = V_S - k_S B_0 \tag{112}$$

so by substituting equation (112) into equations (110) and (111) gives $$V_{LH} = k_H \cdot (V_S - k_S \cdot B_0) + \Delta V_{BH} \tag{113}$$
$$= k_H \cdot V_S + (\Delta V_{BH} - k_H \cdot k_S \cdot B_0)$$

$$V_{LL} = -\{k_L \cdot (V_S - k_S \cdot B_0) + \Delta V_{BL}\} \tag{114}$$
$$= -k_L \cdot V_S + (k_L \cdot k_S \cdot B_0 - \Delta V_{BL})$$

and making the substitutions of equations (65), (66), (68) and (69) gives $$V_{LH} = \left(\frac{K_{XMAX}}{K_0} - 1\right) \cdot V_S + \left[\frac{B_{XMAX}}{K_0} - \left(\frac{K_{XMAX}}{K_0} - 1\right) \cdot k_S \cdot B_0\right] \tag{115}$$

$$V_{LL} = \left(\frac{K_{XMIN}}{K_0} - 1\right) \cdot V_S + \left[\frac{B_{XMIN}}{K_0} - \left(\frac{K_{XMIN}}{K_0} - 1\right) \cdot k_S \cdot B_0\right] \tag{116}$$

Thus the upper and lower limits $V_{LH}$ and $V_{LL}$ of the limiter are also proportional to control signal $V_S$ including a bias portion.

If the limiter shown in FIG. 5 is designed on the basis of the upper and lower limits $V_{LH}$ and $V_{LL}$ of the limiter being proportional to control signal $V_S$, the voltage signals $V_V$, $V_{HC}$, and $V_{LC}$ indicated on FIG. 5 will be given by, in reference to equations (113) and (114), $$V_V = V_X \tag{117}$$

$$V_{HC} = -(\Delta V_{BH} - k_H \cdot k_S \cdot B_0) \tag{118}$$

$$V_{LC} = -(\Delta V_{BL} - k_L \cdot k_S \cdot B_0) \tag{119}$$

and provided as input, while the resistance values of the various resistors will be selected as in equations (102) and (103) so that the equations $$\frac{2R_2}{R_1 + R_2} = k_H \tag{120}$$

$$\frac{R_B}{R_A} = k_L \tag{121}$$

are satisfied.

This is to say, the above limiter can be expressed, including the case when it is designed on the basis of its upper limit $V_{LH}$ and lower limit $V_{LL}$ being proportional to the variable portion $V_K$ of control signal $V_S$, as functions of control signal $V_S$ with $\alpha_H$, $\beta_H$, $\alpha_L$, and $\beta_L$ as constants by the equations $$V_{LH} = \alpha_H \cdot V_S + \beta_H \tag{122}$$

$$V_{LL} = \alpha_L \cdot V_S + \beta_L \quad (123)$$

The limiter of the present invention would be thus constructed such that equations (122) and (123) are satisfied, while the constants $\alpha_H$, $\beta_H$, $\alpha_L$, and $\beta_L$ would be preferably appropriately adjusted.

FIG. 6 is a block diagram illustrating another preferred embodiment of the controller of the invention. Components which are identical to those of the controller shown in FIG. 1 will be given the same numbers as in FIG. 1 and their explanation will be omitted.

Instead of the low-pass filter 22 provided on the output side of differential computing element 21 in FIG. 1, this controller 20' is provided with a low-pass filter 22' which cuts out high-frequency components of the monitor signal $V_{cp}$ provided as output from sensor 26. This low-pass filter 22' is also used for oscillation prevention and it may be provided in this position. Alternately, although not indicated on the diagram, it may also be provided on the output side of the limiter 23.

In this controller 20', a control signal $V_S$ is provided as input to the positive input terminal of differential computing element 21' while a monitor signal $V_{cp}$ is provided as input to the negative terminal of differential computing element 21'. Signal synthesizer 24' of this controller 20' adds the two input signals $M_+$ and $M_-$. Even in this configuration, monitor signal $V_{cp}$ is reversed once (or an odd number of times) with respect to control signal $V_S$, thus comprising negative feedback.

Differential computing element 21' carries out the operation $$V_D = A \cdot (V_s - V_{cp}) \quad (124)$$

This corresponds to equation (23) of the previous preferred embodiment. Hereafter, the same calculations as in the previous preferred embodiment are carried out, so the upper limit $V_{LH}$ and lower limit $V_{LL}$ of limiter 23' are found by, in analogy to equations (70) and (71), $$V_{LH} = k_L \cdot V_K + \Delta V_{BL} \quad (125)$$

$$= -\left[\left(\frac{K_{XMIN}}{K_0} - 1\right) \cdot V_k + \frac{B_{XMIN}}{K_0}\right] \quad (126)$$

$$V_{LL} = -(k_H \cdot V_K + \Delta V_{BH}) \quad (127)$$

$$= -\left[\left(\frac{K_{XMAX}}{K_0} - 1\right) \cdot V_k + \frac{B_{XMAX}}{K_o}\right] \quad (128)$$

provided that $V_S$ is replaced by $V_K$.

At this time, equations (86) and (87) in the previous preferred embodiment become $$-0.3 \cdot \left[\left(\frac{K_{xMIN}}{K_o} - 1\right) \cdot V_K + \frac{B_{xMIN}}{K_o}\right] \leq V_{LH} \leq -1.3 \cdot \quad (129)$$

$$\left[\left(\frac{K_{xMIN}}{K_o} - 1\right) \cdot V_K + \frac{B_{xMIN}}{K_o}\right]$$

$$-1.3 \cdot \left[\left(\frac{K_{xMAX}}{K_o} - 1\right) \cdot V_K + \frac{B_{xMAX}}{K_o}\right] \leq V_{LL} \leq -0.3 \cdot \quad (130)$$

$$\left[\left(\frac{K_{xMAX}}{K_o} - 1\right) \cdot V_K + \frac{B_{xMAX}}{K_o}\right]$$

Furthermore, at this time, when the limiter is designed on the basis of its upper limit $V_{LH}$ and lower limit $V_{LL}$ being proportional to the variable portion $V_K$ of control signal $V_S$, the voltage signals $V_V$, $V_{HC}$, and $V_{LC}$ become, from equations (125) and (127), $$V_V = V^k \quad (131)$$

$$V_{HC} = -\Delta V_{BL} \quad (132)$$

$$V_{LC} = -\Delta V_{BH} \quad (133)$$

$$\frac{R_B}{R_A} = k_H \quad (134)$$

$$\frac{2R_2}{R_1 + R_2} = k_L \quad (135)$$

If designed on the basis of the upper limit $V_{LH}$ and lower limit $V_{LL}$ being proportional to control signal $V_S$ including the bias portion $k_S \cdot B_0$, from equations (125) and (127), $$V_{LH} = k_L \cdot (V_S - k_S \cdot B_0) + \Delta V_{BL} \quad (136)$$
$$= k_L \cdot V_S + \Delta V_{BL} - k_L \cdot k_S \cdot B_0$$

$$= -\left[\left(\frac{K_{XMIN}}{K_0} - 1\right) \cdot V_S + \right. \quad (137)$$

$$\left. \frac{B_{XMIN}}{K_0} - \left(\frac{K_{XMIN}}{K_0} - 1\right) \cdot k_S \cdot B_0\right]$$

$$V_{LL} = -\{k_H \cdot (V_S - k_S \cdot B_0) + \Delta V_{BL}\} \quad (138)$$
$$= -(k_H \cdot V_S + \Delta V_{BH} - k_H \cdot k_S \cdot B_0)$$

$$= -\left[\left(\frac{K_{XMAX}}{K_0} - 1\right) \cdot V_S + \frac{B_{XMAX}}{K_0} - \right. \quad (139)$$

$$\left. \left(\frac{K_{XMAX}}{K_0} - 1\right) \cdot k_S \cdot B_0\right]$$

so from equations (136) and (138), $$V_V = V_X \quad (140)$$

$$V_{HC} = -\Delta V_{BL} + k_L \cdot k_S \cdot B_0 \quad (141)$$

$$V_{LC} = -\Delta V_{BH} k_H \cdot k_S \cdot B_0 \quad (142)$$

$$\frac{R_B}{R_A} = k_H \quad (143)$$

$$\frac{2R_2}{R_1 + R_2} = k_L \quad (144)$$

In this case also, equations (122) and (123) described above $$V_{LH} = \alpha_H \cdot V_S + \beta_H (\alpha_H > 0) \quad (122)$$

$$V_{LL} = \alpha_L \cdot V_S + \beta_L (\alpha_L < 0) \quad (123)$$

hold without modification. Thus, even in the case illustrated in FIG. 6, in which a signal synthesizer adds the two signals $M_+$ and $M_-$, a limiter constructed such that equations (122) and (123) are satisfied would be optimal as the limiter of this invention.

Furthermore, controller 20' illustrated in FIG. 6 is provided with a linearizer 27. In the case that the amplitude of variation of $K_x$ and $B_x$ of the controlled variable P is to be narrowed by means of this linearizer 27, by providing this linearizer 27, the space between the upper limit $V_{LH}$ and lower limit $V_{LL}$ of limiter 23' (the hatched region on FIGS. 3A and 3B) can be narrowed, so more precise control becomes possible.

FIG. 7 is a block diagram illustrating still another different preferred embodiment of the controller of the invention. Components which are identical to those of the controllers shown in FIGS. 1 or 6 will be given the same numbers as in FIGS. 1 or 6 and their explanation will be omitted.

This controller 20'' is provided with a delay circuit 28. This delay circuit 28 is used to compensate for the delay time taken for a signal to travel from point a to point b (system delay time) $\tau_S$, so the delay time $\tau_d$ of the delay circuit 28 is set so that $$\tau_d = \tau_S.$$

Providing a delay circuit 28 is effective in the case when the system delay time $\tau_S$ is large, but often the delay time $\tau_L$ in the passband of low-pass filter 22 compared to the system delay time $\tau_S$ is in the relation $$\tau_L >> \tau_S,$$

so in this case, delay circuit 28 may be omitted.

Figure 8:
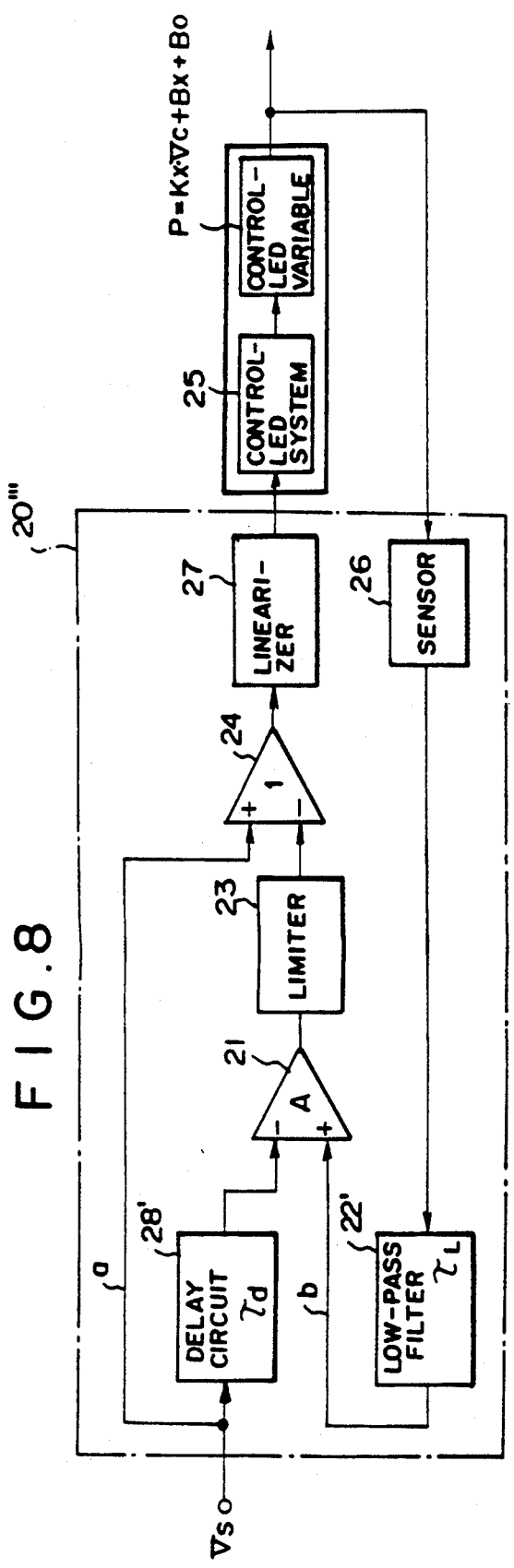
FIG. 8 is a block diagram illustrating still another different preferred embodiment of the controller of the invention.

FIG. 8 is a block diagram illustrating still another different preferred embodiment of the controller of the invention. Components which are identical to those of the controllers shown in FIGS. 1 or 6 will be given the same numbers as in FIGS. 1 or 6 and their explanation will be omitted.

This controller 20''' is provided with a low-pass filter for oscillation prevention 22'. In addition, a delay circuit 28' is provided on the negative input side of differential computing element 21. In this configuration, the delay time $\tau_d$ of the delay circuit 28' is set to be the sum of the system delay time $\tau_S$ and the delay time $\tau_L$ in the passband of low-pass filter 22, giving the equation $$\tau_d = \tau_S + \tau_L.$$

While various preferred embodiments of the present invention have been described in the above explanation, the present invention is in no way limited by these preferred embodiments, but rather it can be provided with various specific structures. Furthermore, the systems which can be controlled are also not limited to any particular system.

The control method and controller of the invention link both open-loop control and feedback control in such a way that not only are each other's disadvantages covered, but also they bring out each other's advantages. In order to do so, a clipped value (clipped signal) is found, and this clipped value (clipped signal) is synthesized with a control signal to obtain from this synthesis a composite value (composite signal) upon which control is carried out. This enables high-speed response to be provided while ringing is suppressed to a sufficiently low level, and the constant error in the steady state can also be sufficiently suppressed.

In addition, in the above controller of the invention, if the limiter satisfies equations (21) and (22) described above, both open-loop control and feedback control can act effectively and stably regardless of the value of control signal $V_S$.

Furthermore, if this limiter has upper and lower limits $V_{LH}$ and $V_{LL}$ which satisfy equations (24) and (25) when the differential computing element carries out the operations of equation (23) and satisfy equations (27) and (28) when the differential computing element carries out the operations of equation (26), then from a practical standpoint, the open-loop control and feedback control will usually act effectively together and a more preferable controller may be comprised.

Also, if the controller of the invention is provided with a low-pass filter for oscillation prevention, it will be able to carry out more stable control.

I claim:

1. A controller which is provided with a control signal as input and controls the output of a controlled system in response to said control signal, comprising:

sensor means for monitoring a controlled variable which is controlled by said controlled system, and for providing as an output, a monitor signal which represents said controlled variable;

differential computing means, coupled to receive said monitor signal, for providing a differential signal representing the difference between said control signal and said monitor signal;

limiter means coupled to receive said differential signal, for clipping said differential signal to a specified upper limit value when said differential signal exceeds said upper limit value, and for clipping said differential signal to a specified lower limit value when said differential signal drops below said lower limit value, thereby providing, as an output, a clipped signal which is said differential signal clipped by said upper limit value and said lower limit value; and signal synthesizer means, coupled to receive said control signal and said clipped signal, for synthesizing said control signal and said clipped signal in such a way that said monitor signal becomes negative feedback to said control signal, and providing a composite signal synthesized from said control signal and said clipped signal, thereby controlling the output of said controlled system based on said composite signal, wherein said control signal is represented by $V_S$, said monitor signal by $V_{CP}$, said differential signal by $V_D$, and said composite signal by $V_C$; said controlled variable P, to within a desired range of control, and a straight-line approximation Q, obtained by taking a straight-line approximation of said controlled variable P, being represented as functions of composite signal $V_C$ by the following equations $$P = K_x V_c + B_x + B_o$$

$$Q = K_x V_c + B_o$$

wherein $K_x$ is the slope of said straight-line approximation Q
   $B_x$ is the straight-line approximation error representing the difference P-Q between said controlled variable P and said straight-line approximation Q and $B_o$ is a constant which represents the value of said straight-line approximation Q when $V_c=0$, and wherein said sensor means operates according to a conversion coefficient $k_s$ for converting said controlled variable P into said monitor signal $V_{CP}$ by the equation $$k_s = P/V_{cp}$$

the averaged value of the amplitude of variation of said slope $K_x$ by $K_o$, a variable portion V of said control signal $V_S$ provided by the equation $$V_K = V_s - k_s B_o$$

the maximum value of the absolute value of said variable portion VK a this time by $V_{SMAX}$, an amplification factor A of said differential computing element is given by the equation $$A = |V_D/(V_K - V_{cp})|$$

and a maximum value and a minimum value of said differential signal $V_D$ defined by $V_{DMAX}$ and $V_{DMIN}$, respectively, and wherein said sensor means has a conversion coefficient $k_S$ which satisfies the relation $$\frac{1}{K_o} \cdot \left(1 - \frac{V_{DMAX} - V_{DMIN}}{A \cdot |V_K|_{MAX}}\right) \leq k_s \leq$$

$$\frac{1}{K_o} \cdot \left(1 + \frac{V_{DMAX} - V_{DMIN}}{A \cdot |V_K|_{MAX}}\right).$$

2. A controller which is provided with a control signal as input and controls the output of a controlled system in response to said control signal, comprising:

sensor means for monitoring a controlled variable which is controlled by said controlled system, and for providing as an output, a monitor signal which represents said controlled variable;

differential computing means, coupled to receive said monitor signal, for providing a differential signal representing the difference between said control signal and said monitor signal;

limiter means coupled to receive said differential signal, for clipping said differential signal to a specified upper limit value when said differential signal exceeds said upper limit value, and for clipping said differential signal to a specified lower limit value when said differential signal drops below said lower limit value, thereby providing, as an output, a clipped signal which is said differential signal cliped by said upper limit value and said lower limit value; and signal synthesizer means, coupled to receive said control signal and said clipped signal, for synthesizing said control signal and said clipped signal in such a way that said monitor signal becomes negative feedback to said control signal, and providing a composite signal synthesized from said control signal and said clipped signal, thereby controlling the output of said controlled system based on said composite signal, wherein said control signal is represented by $V_S$, said monitor signal by $V_{CP}$, said differential signal by $V_D$, and said composite signal by $V_C$; in which said controlled variable P and its straight-line approximation Q, obtained by taking a straight-line approximation of said controlled variable P, is represented, to within a desired range of control, as functions of composite signal $V_C$ with the equations $$P = K_x \cdot V_c + B_x + B_o$$

$$Q = K_x \cdot V_c + B_o$$

provided that $K_x$ is the slope of said straight-line approximation Q $B_x$ is the straight-line approximation error representing the difference P-Q between said controlled variable P and said straight-line approximation Q and $B_o$ is a constant which represents the value of said straight-line approximation Q when $V_C=0$, the maximum value, average value and minimum value of the amplitude of variation of said slope $K_x$ are given by $K_{xMAX}$, $K_o$, and $K_{xMIN}$, respectively, the maximum positive value and maximum negative value of the amplitude of variation of said straight-line approximation error $B_x$ by $B_{xMAX}$ and $B_{xMIN}$, respectively, said specified upper limit by $V_{LH}$, said specified lower limit by $V_{LL}$, a conversion coefficient $K_s$ of said sensor means for converting said controlled variable P into said monitor signal $V_{CP}$ is given by $$k_s = P/V_{cp}$$

the variable portion $V_K$ of said control signal $V_S$ at this time by $$V_K = V_s - k_s B_o$$

and the amplification factor A of said differential computing element by $$A = |V_D/(V_s - V_{cp})|$$

when said differential computing element carries out the operation given by $$V_D = A \cdot (V_{cp} - V_s)$$

said limiter means having said upper limit $V_{LH}$ and said lower limit $V_{LL}$ which satisfy relations $$0.3 \cdot \left(\left(\frac{K_{xMAX}}{K_o} - 1\right) \cdot V_K + \frac{B_{xMAX}}{K_o}\right) \leq V_{LH} \leq 1.3 \cdot$$

$$\left(\left(\frac{K_{xMAX}}{K_o} - 1\right) \cdot V_K + \frac{B_{xMAX}}{K_o}\right)$$

and $$1.3 \cdot \left(\left(\frac{K_{xMIN}}{K_o} - 1\right) \cdot V_K + \frac{B_{xMIN}}{K_o}\right) \leq V_{LL} \leq 0.3 \cdot$$

-continued $$\left(\left(\frac{K_{xMIN}}{K_o} - 1\right) \cdot V_K + \frac{B_{xMIN}}{K_o}\right).$$

3. A controller which is provided with a control signal as input and controls the output of a controlled system in response to aid control signal, comprising:

sensor means for monitoring a controlled variable which is controlled by said controlled system, and for providing as an output, a monitor signal which represents said controlled variable;

differential computing means, coupled to receive said monitor signal, for providing a differential signal representing the difference between said control signal and said monitor signal;

limiter means coupled to receive said differential signal, for clipping said differential signal to a specified upper limit value when said differential signal exceeds said upper limit value, and for clipping said differential signal to a specified lower limit value when said differential signal drops below said lower limit value, thereby providing, as an output, a clipped signal which is said differential signal clipped by said upper limit value and said lower limit value; and signal synthesizer means, coupled to receive said control signal and said clipped signal, for synthesizing said control signal and said clipped signal in such a way that said monitor signal becomes negative feedback to said control signal, and providing a composite signal synthesized from said control signal and said clipped signal, thereby controlling the output of said controlled system based on said composite signal, wherein said control signal is represented by $V_S$, said monitor signal by $V_{CP}$, said differential signal by $V_D$, and said composite signal by $V_C$, in which said controlled variable P and its straight-line approximation Q, obtained by taking a straight-line approximation of said controlled variable P, is represented, to within a desired range of control, as functions of composite signal $V_C$ with the equations $$P = K_x \cdot V_c + B_x + B_o$$

$$Q = K_x \cdot V_c + B_o$$

provided that $K_x$ is the slope of said straight-line approximation Q $B_x$ is the straight-line approximation error representing the difference P-Q between said controlled variable P and said straight-line approximation Q and $B_o$ is a constant which represents the value of said straight-line approximation Q when $V_C = 0$, the maximum value, averaged value and minimum value of the amplitude of variation of said slope $K_x$ are given by $K_{xMAX}$, $K_o$, and $K_{xMIN}$, respectively, the maximum positive value and maximum negative value of the amplitude of variation of said straight-line approximation error $B_x$ by $B_{xMAX}$ and $B_{xMIN}$, respectively, said specified upper limit by $V_{LH}$, said specified lower limit by $V_{LL}$, a conversion coefficient $k_s$ of said sensor means for converting said controlled variable P into said monitor signal $V_{CP}$ is given by $$k_s = P/V_{cp}$$

the variable portion $V_k$ of said control signal $V_s$ at this time by $$V_K = V_s - k_s B_o$$

and the amplification factor A of said differential computing element by $$A = |V_D/(V_s - V_{cp})|$$

when said differential computing element carries out the operation given by $$V_D = A \cdot (V_s - V_{cp})$$

said limiter means having said upper limit $V_{LH}$ and said lower limit $V_{LL}$ which satisfy relations $$-0.3 \cdot \left(\left(\frac{K_{xMIN}}{K_o} - 1\right) \cdot V_K + \frac{B_{xMIN}}{K_o}\right) \leq V_{LH} \leq -1.3 \cdot$$

$$\left(\left(\frac{K_{xMIN}}{K_o} - 1\right) \cdot V_K + \frac{B_{xMIN}}{K_o}\right)$$

and $$-1.3 \cdot \left(\left(\frac{K_{xMAX}}{K_o} - 1\right) \cdot V_K + \frac{B_{xMAX}}{K_o}\right) \leq V_{LL} \leq -0.3 \cdot$$

$$\left(\left(\frac{K_{xMAX}}{K_o} - 1\right) \cdot V_K + \frac{B_{xMAX}}{K_o}\right).$$

4. A controller as defined in claim 1, 2 or 3, further comprising low-pass filters for providing oscillation prevention, said low-pass filters being provided between said sensor means and said differential computer means.

5. A controller as defined in claim 1, 2 or 3, further comprising low-pass filters for providing oscillation prevention, said low-pass filters being provided between said differential computing means and said limiter means.

6. A controller as defined in claim 1, 2 or 3, further comprising low-pass filters for providing oscillation prevention, said low-pass filters being provided between said limiter means and said signal synthesizer means.

* * * * *